United States Patent
Doe et al.

(10) Patent No.: US 9,240,612 B2
(45) Date of Patent: Jan. 19, 2016

(54) LAYERED MATERIALS WITH IMPROVED MAGNESIUM INTERCALATION FOR RECHARGEABLE MAGNESIUM ION CELLS

(71) Applicants: Robert Ellis Doe, Norwood, MA (US); Craig Michael Downie, Waltham, MA (US); Christopher Fischer, Somerville, MA (US); George Hamilton Lane, St. Helens (AU); Dane Morgan, Middleton, WI (US); Josh Nevin, Belmont, MA (US); Gerbrand Ceder, Wellesley, MA (US); Kristin Aslaug Persson, Orinda, CA (US); David Eaglesham, Lexington, MA (US)

(72) Inventors: Robert Ellis Doe, Norwood, MA (US); Craig Michael Downie, Waltham, MA (US); Christopher Fischer, Somerville, MA (US); George Hamilton Lane, St. Helens (AU); Dane Morgan, Middleton, WI (US); Josh Nevin, Belmont, MA (US); Gerbrand Ceder, Wellesley, MA (US); Kristin Aslaug Persson, Orinda, CA (US); David Eaglesham, Lexington, MA (US)

(73) Assignee: PELLION TECHNOLOGIES, INC., Cambridge, MA (US)

( * ) Notice: Subject to any disclaimer, the term of this patent is extended or adjusted under 35 U.S.C. 154(b) by 0 days.

(21) Appl. No.: 13/794,440

(22) Filed: Mar. 11, 2013

(65) Prior Publication Data

US 2014/0106214 A1 Apr. 17, 2014

Related U.S. Application Data

(60) Provisional application No. 61/617,512, filed on Mar. 29, 2012.

(51) Int. Cl.
*H01M 6/04* (2006.01)
*H01M 10/054* (2010.01)
*H01M 4/38* (2006.01)
*H01M 4/36* (2006.01)
*H01M 4/583* (2010.01)

(52) U.S. Cl.
CPC ............ *H01M 10/054* (2013.01); *H01M 4/366* (2013.01); *H01M 4/381* (2013.01); *H01M 4/583* (2013.01)

(58) Field of Classification Search
None
See application file for complete search history.

(56) References Cited

U.S. PATENT DOCUMENTS

| | | | | |
|---|---|---|---|---|
| 2010/0310933 | A1* | 12/2010 | Jiang et al. | 429/188 |
| 2011/0189543 | A1* | 8/2011 | Choi et al. | 429/220 |
| 2011/0262804 | A1* | 10/2011 | Muldoon et al. | 429/207 |
| 2013/0004830 | A1* | 1/2013 | Song et al. | 429/163 |

OTHER PUBLICATIONS

Levi et al., On the way to rechargeable Mg batteries: the challenge of new cathode materials, Chem. Mater,2010,22,860-868).*

* cited by examiner

*Primary Examiner* — Patrick Ryan
*Assistant Examiner* — Jose Colucci Rios
(74) *Attorney, Agent, or Firm* — Milstein Zhang & Wu LLC; Joseph B. Milstein

(57) ABSTRACT

Electrochemical devices which incorporate cathode materials that include layered crystalline compounds for which a structural modification has been achieved which increases the diffusion rate of multi-valent ions into and out of the cathode materials. Examples in which the layer spacing of the layered electrode materials is modified to have a specific spacing range such that the spacing is optimal for diffusion of magnesium ions are presented. An electrochemical cell comprised of a positive intercalation electrode, a negative metal electrode, and a separator impregnated with a nonaqueous electrolyte solution containing multi-valent ions and arranged between the positive electrode and the negative electrode active material is described.

20 Claims, 20 Drawing Sheets

LAYERED MATERIALS WITH IMPROVED MAGNESIUM INTERCALATION FOR RECHARGEABLE MAGNESIUM ION CELLS

CROSS-REFERENCE TO RELATED APPLICATIONS

This application claims priority to and the benefit of U.S. provisional patent application Ser. No. 61/617,512, filed Mar. 29, 2012, which application is incorporated herein by reference in its entirety.

STATEMENT REGARDING FEDERALLY FUNDED RESEARCH OR DEVELOPMENT

This invention was made with government support under award number DE-AR0000062, awarded by Advanced Research Projects Agency-Energy (ARPA-E), U.S. Department of Energy. The government has certain rights in the invention.

FIELD OF THE INVENTION

The invention relates to electrode materials in general and particularly to electrode materials useful in secondary batteries that employ Mg in their electrolytes.

BACKGROUND OF THE INVENTION

A variety of new secondary electrochemical cells that exhibit high energy density have been demonstrated. However, commercial systems remain primarily based on lithium ion (Li-ion) chemistry. Such cells frequently consist of a layered transition metal oxide cathode material, an anode-active lithium metal or lithium intercalation or alloy compound such as graphitic carbon, tin and silicon, and an electrolytic solution containing a dissolved lithium-based salt in an aprotic organic or inorganic solvent or polymer. Today there is great demand for energy storage devices that exhibit higher volumetric and gravimetric energy density when compared to commercially available lithium ion batteries. Consequently an increasingly sought after route to meeting this demand higher energy density is to replace the monovalent cation lithium ($Li^+$) with multi-valent ions, such as divalent magnesium cations ($Mg^{2+}$), because these ions can enable many times the charge of $Li^+$ to be transferred per ion.

Furthermore, alkali metals, and lithium in particular, have numerous disadvantages. Alkali metals are expensive. Alkali metals are highly reactive. Alkali metals are also highly flammable, and fire resulting from the reaction of alkali metals with oxygen, water or other active materials is extremely difficult to extinguish. Lithium is poisonous and compounds thereof are known for their severe physiological effects, even in minute quantities. As a result, the use of alkali metals requires specialized facilities, such as dry rooms, specialized equipment and specialized procedures.

Gregory et al., "Nonaqueous Electrochemistry of Magnesium; Applications to Energy Storage" J. Electrochem. Soc., Vol. 137, No. 3, March 1990 discloses $Co_3O_4$, $Mn_2O_3$, $Mn_3O_4$, $MoO_3$, $PbO_2$, $Pb_3O_4$, $RuO_2$, $V_2O_5$, $WO_3$, $TiS_2$, $VS_2$, $ZrS_2$, $MoB_2$, $TiB_2$, and $ZrB_2$ as positive electrode materials for a magnesium battery. However, only the first cycle discharge is shown and all materials exhibit significant polarization for medium current densities.

Novak et al., "Electrochemical Insertion of Magnesium in Metal Oxides and Sulfides from Aprotic Electrolytes," JECS 140 (1) 1993 discloses $TiS_2$, $ZrS_2$, $RuO_2$, $Co_3O_4$ and $V_2O_5$ as positive electrode materials of a magnesium battery. However, only layered $V_2O_5$ shows promising capacity and reversibility. Furthermore, Novak et al. show that $Mg^{2+}$ insertion into this oxide depends on the ratio between the amounts of $H_2O$ and $Mg^{2+}$ as well as on the absolute amount of $H_2O$ in the electrolyte. According to Novak, water molecules preferentially solvate $Mg^{2+}$ ions, which facilitate the insertion process by co-intercalation.

Novak et al., "Electrochemical Insertion of Magnesium into Hydrated Vanadium Bronzes" Electrochem. Soc., Vol. 142, No. 8, 1995 discloses $Mg^{2+}$ insertion into layered vanadium bronzes, $MeV_3O_8(H2O)_y$, where (Me=Li, Na, K, $Ca_{0.5}$, and $Mg_{0.5}$). Variations in the content of bound lattice water in the bronzes were found to be responsible for a difference in the electrochemical properties of the same starting material dried at different temperatures. The presence of this water was deemed essential but the lattice water is removed during cycling after which the capacity deteriorates. Furthermore, attempts to cycle the compounds in dry electrolytes failed. The beneficial effect of water was speculated to be due to its solvation of the $Mg^{2+}$ ion.

Le et al., "Intercalation of Polyvalent Cations into $V_2O_5$ Aerogels" Chem. Mater. 1998, 10, 682-684 discloses multi-valent ion insertion into $V_2O_5$ areogels where the small diffusion distances and high surface area are regarded as beneficial for multi-valent intercalation. X-ray diffraction of the aerogel shows an interlayer spacing of 12.5 Å (due to retaining acetone), as compared to the 8.8 Å characteristic of the $V_2O_5*0.5H_2O$ xerogel.

Amatucci et al., "Investigation of Yttrium and Polyvalent Ion Intercalation into Nanocrystalline Vanadium Oxide," J Electrochem Soc, 148(8), A940-A950, Jul. 13, 2001, show reversible intercalation of several multi-valent cations ($Mg^{2+}$, $Ca^{2+}$, $Y^{3+}$) into nano-metric layered $V_2O_5$ but with significant polarization (e.g., energy loss) and at a low rate of 0.04 C which signifies the low diffusivity of the Mg ions.

The current, proven state of the art high energy, rechargeable Mg cell is described by Aurbach et al., U.S. Pat. No. 6,316,141, issued Nov. 13, 2001, as a cell comprised of a magnesium metal anode, a "Chevrel" phase active material cathode, and an electrolyte solution derived from an organometallic complex containing Mg. Chevrel compounds are a series of ternary molybdenum chalcogenide compounds first reported by R. Chevrel, M. Sergent, and J. Prigent in J. Solid State Chem. 3, 515-519 (1971). The Chevrel compounds have the general formula $M_xMo_6X_8$, where M represents any one of a number of metallic elements throughout the periodic table; x has values between 1 and 4, depending on the M element; and X is a chalcogen (sulfur, selenium or tellurium). Furthermore, in E. Levi et al, "New Insight on the Unusually High Ionic Mobility in Chevrel Phases," Chem Mat 21 (7), 1390-1399, 2009, the Chevrel phases are described as unique materials which allow for a fast and reversible insertion of various cations at room temperature.

Michot et al., U.S. Pat. No. 6,395,367, issued May 28, 2002, is said to disclose ionic compounds in which the anionic load has been delocalized. A compound disclosed by the invention includes an anionic portion combined with at least one cationic portion $M^{m+}$ in sufficient numbers to ensure overall electronic neutrality; the compound is further comprised of M as a hydroxonium, a nitrosonium $NO^+$, an ammonium $NH_4^+$, a metallic cation with the valence m, an organic cation with the valence m, or an organometallic cation with the valence m. The anionic load is carried by a pentacyclical nucleus of tetrazapentalene derivative bearing electroattractive substituents. The compounds can be used notably for ionic conducting materials, electronic conducting materials, colorant, and the catalysis of various chemical reactions.

U.S. Pat. No. 6,426,164 B1 to Yamaura et al., issued Jul. 30, 2002, is said to disclose a non-aqueous electrolyte battery capable of quickly diffusing magnesium ions and improving cycle operation resistance, incorporating a positive electrode containing $Li_xMO_2$ (where M is an element containing at least Ni or Co) as a positive-electrode active material thereof; a negative electrode disposed opposite to the positive electrode and containing a negative-electrode active material which permits doping/dedoping magnesium ions: and a non-aqueous electrolyte disposed between the positive electrode and the negative electrode and containing non-aqueous solvent and an electrolyte constituted by magnesium salt, wherein the value of x of $Li_xMO_2$ satisfies a range $0.1 \leq x \leq 0.5$. It is also said that for Li concentrations $x \leq 0.1$, the host material becomes unstable and for higher Li concentrations $x \geq 0.5$, there are not enough available Mg lattice sites available. Specifically, there is no mention of interlayer distance.

Michot et al., U.S. Pat. No. 6,841,304, issued Jan. 11, 2005, is said to disclose novel ionic compounds with low melting point whereof the onium type cation having at least a heteroatom such as N, O, S or P bearing the positive charge and whereof the anion includes, wholly or partially, at least an ion imide such as $(FX^1O)N^-(OX^2F)$ wherein $X^1$ and $X^2$ are identical or different and comprise SO or PF, and their use as solvent in electrochemical devices. Said composition comprises a salt wherein the anionic charge is delocalised, and can be used, inter alia, as electrolyte.

U.S. Patent Application Publication No. 20090068568 A1 (Yamamoto et al. inventors), published on Mar. 12, 2009, is said to disclose a magnesium ion containing non-aqueous electrolyte in which magnesium ions and aluminum ions are dissolved in an organic etheric solvent, and which is formed by: adding metal magnesium, a halogenated hydrocarbon RX, an aluminum halide $AlY_3$, and a quaternary ammonium salt $R^1R^2R^3R^4N^+Z^-$ to an organic etheric solvent; and applying a heating treatment while stirring them (in the general formula RX representing the halogenated hydrocarbon, R is an alkyl group or an aryl group, X is chlorine, bromine, or iodine, in the general formula $AlY_3$ representing the aluminum halide, Y is chlorine, bromine, or iodine, in the general formula $R^1R^2R^3R^4N^+Z^-$ representing the quaternary ammonium salt, $R^1$, $R^2$, $R^3$, and $R^4$ represent each an alkyl group or an aryl group, and Z represents chloride ion, bromide ion, iodide ion, acetate ion, perchlorate ion, tetrafluoro borate ion, hexafluoro phosphate ion, hexafluoro arsenate ion, perfluoroalkyl sulfonate ion, or perfluoroalkyl sulfonylimide ion. These additives are aimed at increasing the stability of the electrolyte in atmospheric air and facilitate the production process for said electrolytes.

U.S. Patent Application Publication No. 20100136438 A1 (Nakayama et al. inventors), published Jun. 3, 2010, is said to disclose a magnesium battery that is constituted of a negative electrode, a positive electrode and an electrolyte. The negative electrode is formed of metallic magnesium and can also be formed of an alloy. The positive electrode is composed of a positive electrode active material, for example, a metal oxide, graphite fluoride $((CF)_n)$ or the like, etc. The electrolytic solution is, for example, a magnesium ion containing nonaqueous electrolytic solution prepared by dissolving magnesium(II) chloride $(MgCl_2)$ and dimethylaluminum chloride $((CH_3)_2AlCl)$ in tetrahydrofuran (THF). In the case of dissolving and depositing magnesium by using this electrolytic solution, they indicate that the following reaction proceeds in the normal direction or reverse direction.

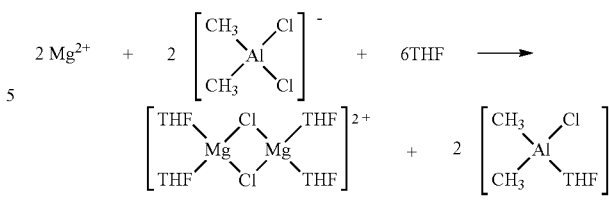

According to this, there are provided a magnesium ion-containing nonaqueous electrolytic solution having a high oxidation potential and capable of sufficiently bringing out excellent characteristics of metallic magnesium as a negative electrode active material and a method for manufacturing the same, and an electrochemical device with high performances using this electrolytic solution.

U.S. Patent Application Publication No. 20110111286 A1 (Yamamoto el at. inventors), published on May 12, 2011, is said to disclose a nonaqueous electrolytic solution containing magnesium ions which shows excellent electrochemical characteristics and which can be manufactured in a general manufacturing environment such as a dry room, and an electrochemical device using the same are provided. A Mg battery has a positive-electrode can, a positive-electrode pellet made of a positive-electrode active material or the like, a positive electrode composed of a metallic net supporting body, a negative-electrode cup, a negative electrode made of a negative-electrode active material, and a separator impregnated with an electrolytic solution and disposed between the positive-electrode pellet and the negative-electrode active material. Metal Mg, an alkyl trifluoromethanesulfonate, a quaternary ammonium salt or/and a 1,3-alkylmethylimidazolium salt, more preferably, an aluminum halide are added to an ether system organic solvent and are then heated, and thereafter, more preferably, a trifluoroboraneether complex salt is added thereto, thereby preparing the electrolytic solution. By adopting a structure that copper contacts the positive-electrode active material, the electrochemical device can be given a large discharge capacity.

Nazar et al, "Insertion of Poly(p-phenylenevinylene) in Layered $MoO_3$", J. Am. Chem. Soc. 1992, 114, 6239-6240 discloses insertion of high molecular weight PPV into a layered oxide by intercalating the PPV precursor polymer between the layers of $MoO_3$, by ion exchange. The layer spacing was reported to increase from 6.9 Å to 13.3 Å. No electrochemical investigations of the host material were performed.

Nazar et al, "Hydrothermal Synthesis and Crystal Structure of a Novel Layered Vanadate with 1,4-Diazabicyclo [2.2.2]octane as the Structure-Directing Agent: $C_6H_{14}N_2$—$V_6O_{14} \cdot H_2O$" Chem. Mater. 1996, 8, 327 discloses Li insertion into organic cation ($C_6H_{12}N_2$ or 'DABCO')-templated vanadium oxide resulting from hydrothermal synthesis. The host crystal structure possesses a structure composed of a new arrangement of edge-shared $VO_5$ square pyramids that are corner-shared with $VO_4$ tetrahedra to form highly puckered layers, between which the DABCO cations are sandwiched. The results show that Li insertion is hindered in the DABCO-filled host and improved performance is obtained when the DABCO ion is removed.

Goward et al, "Poly(pyrrole) and poly(thiophene)/vanadium oxide interleaved nanocomposites: positive electrodes for lithium batteries", Electrochimica Acta, 43, 10-11, pp. 1307, 1998 reports on synthesis and electrochemical investigation of conductive polymer-$V_2O_5$ nanocomposites that have a structure comprised of layers of polymer chains interleaved with inorganic oxide lamellae. It was found that for modified [PANI]-$V_2O_5$, polymer incorporation resulted in better reversibility, and increased Li capacity in the nanocomposite compared to the original $V_2O_5$ xerogel. For PPY and PTH nanocomposites, the electrochemical response was highly dependent on the preparation method, nature of the polymer, and its location. In conclusion, Goward et al note that the results, though promising, were still short of theoretical expectations.

Chirayil et al, 'Synthesis and characterization of a new vanadium oxide, TMA-$V_8O_2O$' J. Mater. Chem., 1997, 7(11), 2193-2195 discloses synthesis of a layered vanadium oxide with a new monoclinic structure in which the tetramethylammonium ions reside between the vanadium oxide layers. The powder X-ray diffraction pattern indicate that this new vanadium oxide has an interlayer spacing of 11.5 Angstrom. Electrochemical investigation of the compound indicates that Li insertion is hindered due to the TMA ions between the layers.

Lutta et al, "Solvothermal synthesis and characterization of a layered pyridinium vanadate, $C_5H_6N$—$V_3O_7$" J. Mater. Chem., 2003, 13, 1424-1428 reports on synthesis and properties of a layered vanadate which has an aromatic intercalate (pyridinium ion) between the vanadium oxide layers: pyH-$V_3O_7$. Chemical lithiation show some reactivity with Li but better performance was obtained when the pyridinium was removed from the vanadate. Indeed, Lutta et al concludes with saying that none of the aromatic $V_3O_7$ based structures (TMA-$V_3O_7$, MA-$V_3O_7$, pyH—$V_3O_7$) or their decomposition products lead to electrochemically interesting materials.

The results described above show that slow diffusion of multi-valent ions in layered cathode materials is a limiting factor in rechargeable multi-valent electrochemical cells.

Furthermore, the results above also show that it is commonly believed that organic-inorganic hybrid host materials do not improve intercalation performance, specifically for lithium ions.

There is a need for systems and methods for making improved positive electrode layered materials with high energy density as well as facile Mg ion diffusion.

SUMMARY OF THE INVENTION

According to one aspect, the invention features an energy-storage apparatus. The energy-storage apparatus comprises an anode configured to accept Mg ions from an electrolyte and to release Mg-ions to the electrolyte, the anode having at least one anode electrical connection on an external surface of the energy-storage apparatus, and having at least one anode surface within the energy-storage apparatus; a cathode comprising a layered crystalline compound comprising a transition metal, wherein an interlayer metal-metal distance in the layered crystalline compound is 4.8 Angstrom or more, the layered crystalline compound having at least one cathode electrical connection on an external surface of the energy-storage apparatus and having at least one cathode surface within the energy-storage apparatus; and the electrolyte comprising a magnesium-bearing electrolyte in contact with the at least one anode surface within the energy-storage apparatus, and in contact with the at least one cathode surface within the energy-storage apparatus.

In one embodiment, the cathode comprising a layered crystalline compound comprises a compound having the chemical formula $Mg_aM_bX_y$, wherein M is a metal cation or a mixture of metal cations, X is an anion or mixture of anions, a is in the range of 0 to about 2, b is in the range of about 1 to about 2, and $y \le 9$.

In another embodiment, at least one of the anode and the cathode further comprises an electronically conductive additive.

In yet another embodiment, the at least one of the anode and the cathode further comprises a polymer binder.

In still another embodiment, the anode configured to accept and release Mg-ions comprises a material selected from the group consisting of Mg, Mg alloys AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, and Mg alloys containing at least one of the elements Al, Ca, Bi, Sb, Sn, Ag, Cu, and Si.

In a further embodiment, the anode configured to accept and release Mg-ions comprises insertion materials including one or more of Anatase $TiO_2$, rutile $TiO_2$, $Mo_6S_8$, $FeS_2$, $TiS_2$, and $MoS_2$ and combinations thereof.

In yet a further embodiment, the wherein at least one of the cathode and the anode comprises a carbonaceous material.

In an additional embodiment, the energy-storage apparatus is a secondary battery.

According to another aspect, the invention relates to an energy-storage apparatus. The energy-storage apparatus, comprises an anode configured to accept Mg ions from an electrolyte and to release Mg-ions to the electrolyte, the anode having at least one anode electrical connection on an external surface of the energy-storage apparatus, and having at least one anode surface within the energy-storage apparatus; a cathode comprising a layered crystalline compound comprising a deliberately added specie or species so that a layer spacing of the layered crystalline compound is modified to allow for magnesium ion diffusion sufficient to support at least a C/5 discharge rate of the energy storage apparatus, the layered crystalline compound having at least one cathode electrical connection on an external surface of the energy-storage apparatus and having at least one cathode surface within the energy-storage apparatus; and the electrolyte comprising a magnesium-bearing electrolyte in contact with the at least one anode surface within the energy-storage apparatus, and in contact with the at least one cathode surface within the energy-storage apparatus.

In one embodiment, a layer spacing of the layered crystalline compound is modified to allow for magnesium ion diffusion sufficient to support at least a C/15 discharge rate of the energy storage apparatus.

In another embodiment, the energy-storage apparatus is a secondary battery.

In yet another embodiment, a shortest metal-metal inter-layer distance in the layered crystalline compound is larger than 4.8 Angstrom.

In still another embodiment, a shortest metal-metal inter-layer distance in the layered crystalline compound is smaller than 8 Angstrom.

In a further embodiment, a shortest metal-metal inter-layer distance in the layered crystalline compound is smaller than 12 Angstrom.

In yet a further embodiment, the cathode comprising a layered crystalline compound comprises a compound having the chemical formula $Mg_aM_bX_y$, wherein M is a metal cation, or mixture of metal cations and X is an anion or mixture of anions, and a is in the range of 0 to about 2, b is in the range of about 1 to about 2, and $y \le 9$.

In an additional embodiment, at least one of the anode and the cathode further comprises an electronically conductive additive.

In one more embodiment, at least one of the anode and the cathode further comprises a polymer binder.

In still a further embodiment, the anode configured to accept and release Mg-ions comprises a material selected from the group consisting of Mg, Mg alloys AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, and Mg alloys containing at least one of the elements Al, Ca, Bi, Sb, Sn, Ag, Cu, and Si.

In one more embodiment, the anode configured to accept and release Mg-ions comprises insertion materials selected from the group of insertion materials consisting of Anatase $TiO_2$, rutile $TiO_2$, $Mo_6S_8$, $FeS_2$, $TiS_2$, and $MoS_2$ and combinations thereof.

In still a further embodiment, at least one of the cathode and the anode comprises a carbonaceous material.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1A:
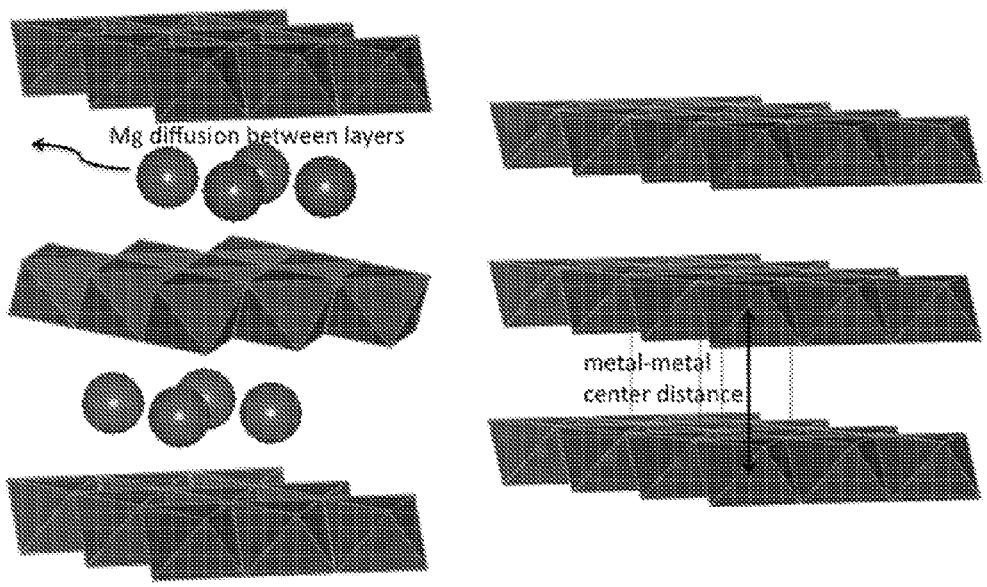
FIG. 1A is a schematic diagram of a layered material with Mg ions situated in the layer and the shortest metal-metal inter-layer center distance indicated.

The present invention relates to layered materials with a slab spacing of said layered material being within a specific range of values optimal for multi-valent ion diffusion. More specifically, the invention is directed to rechargeable magnesium batteries with high energy density and high power and the method described herein aims to increase the diffusivity of magnesium ions inside a host layered positive electrode material, while still maintaining structural integrity and stable cycling performance of said electrode material.

Multi-valent ion intercalation is expected to increase the accessible energy density of the positive electrode material as more than one electron per intercalated ion can be utilized.

In contrast to lithium and other alkali metals, the abundance of some alkaline earth metals, such as Mg metal and readily available compounds containing Mg, is expected to provide significant cost reduction relative to Li-ion batteries, and are expected to provide superior safety and waste disposal characteristics.

Positive electrode layered materials that allow facilitated diffusion of multi-valent ions are described. Improved layered cathode materials are expected to provide for the production of a practical, rechargeable multi-valent (e.g., magnesium) battery, which are expected to be safer and cleaner, and more durable, efficient and economical than heretofore known.

The present invention successfully addresses the shortcomings in terms of multi-valent ionic mobility inside layered positive electrode materials and provides the basis for the production of a viable, rechargeable high-energy density magnesium battery.

In this description is provided a specific range of inter-layer distances in layered electrode materials which optimize the mobility of the multi-valent ion (as distinct from a uni-valent ion, such as Li$^+$, Na$^+$ or K$^+$) that can be chosen from the alkaline earth, scandium or boron family (e.g., Mg$^{2+}$, Ca$^{2+}$, Al$^{3+}$, Y$^{3+}$, etc) within the host electrode material and thus improves the operation of a multi-valent electrochemical cell. To achieve this, according to one aspect of the invention, there is provided a positive electrode containing a positive-electrode active material with a layered structure; a negative electrode disposed opposite to the positive electrode and containing a negative-electrode active material which allows plating and dissolution of multi-valent ions; and a non-aqueous electrolyte disposed between the positive and negative electrode, containing a non-aqueous solvent as well as a multi-valent cation salt. According to another aspect of the invention, there is a modification of the positive electrode material such that the layer spacing of the modified structure is larger than 4.8 Å.

The layered active-electrode material has a structure that permits diffusion paths of multi-valent ions in two-dimensional shapes while still maintaining high energy density per volume unit. According to another aspect of the invention, the modified layer spacing of the positive electrode material is not larger than 8 Å.

According to one aspect of the invention, modified layered cathode materials with expanded spacing using a scaffolding agent inside the layers in two-dimensional multi-valent diffusing positive electrode materials are described. An expanded interlayer spacing is expected to improve multi-valent ionic diffusion in layered materials. Slow diffusion of ions in layered materials is believed to represent a limitation for practical use as positive electrode materials in rechargeable multi-valent ion electrochemical cells.

In use, the layered cathode material can be treated to have a modified interlayer spacing at any time, including at a time before the electrode material is placed in a rechargeable electrochemical cell, at a time after the electrode material is placed in an electrochemical cell, and at such time that the material is made operational within an electrochemical cell.

The scaffolding agent can be inorganic molecules or cations that are electrochemically inactive in the cell operating voltage.

The scaffolding agent can be an organic molecule or organic cation.

One such family of scaffolding agents are onium compounds. Onium compounds are cations derived by the protonation of mononuclear parent hydrides of elements of the nitrogen group (Group 15 of the Periodic Table of the Elements), chalcogens (Group 16), or halogens (Group 17), and similar cations derived by the substitution of hydrogen atoms in the former by other groups, such as organic radicals, or halogens, for example tetramethylammonium, and further derivatives having polyvalent additions, such as iminium and nitrilium.

Figure 5:
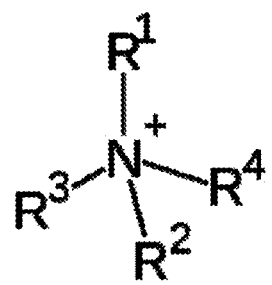
FIG. 5 is a schematic diagram of an example onium ion. The moieties $R^1$, $R^2$, $R^3$, and $R^4$ each represent an alkyl, aryl, alkenyl, alkynyl group, or mixture thereof, and N+ can be substituted for other cation centers including, but not limited, to P, As, Sb, Bi, F, and S.
Figure 6:
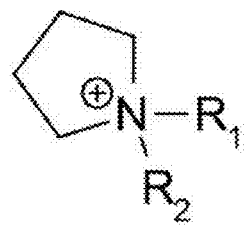
FIG. 6 is a diagram of a pyrrolidinium ion.

Onium ions can contain a long (C$_6$+) chain radical. Examples of such suitable organic C$_6$+ onium ion molecules include primary, secondary, tertiary, or quaternary ammonium, sulfonium, phosphonium, oxonium or any ion of an element in Groups V or VI of the periodic table of elements. An example of an organic onium cation is presented in FIG. 5.

The long chain can act as a spacing/compartmentalization agent. According to one embodiment, the spacing agent has at least one binding site capable of ion-exchanging or replacing Li$^+$, Na$^+$, K$^+$, Ca$^{2+}$, Mg$^{2+}$ or other inorganic cations that may occur within the layer spacing of the target material.

In one embodiment, the modification of the layered cathode material involves co-intercalation of an onium ion, such as N-methyl-N-propylpyrrolidinium (known as "P13"), together with an alkaline earth ion, such as Mg$^{2+}$, into the host material during the first discharge. The intercalation increases the layer spacing of the host positive electrode material and thereby facilitates magnesium diffusion.

In another embodiment, the active layered cathode material can be electrochemically pre-treated in an electrolyte solution containing onium ions, discharged to a desirable degree and then transferred to the battery cell. In either embodiment, an advantageous result of the process is a positive layered electrode host material with expanded layer spacing, which enables fast diffusion of multi-valent ions for rechargeable electrochemical cells.

In yet another embodiment, the active layered cathode material can be chemically pre-treated in a solution containing onium ions, so as to chemically intercalate within the layers enabling a host material with expanded layer spacing and fast diffusion of multi-valent ions.

Hence, according to further features in preferred embodiments of the invention described below, the electrolyte containing onium ions according to the present invention is incorporated into specific electrochemical cells containing an appropriate anode and layered cathode pair.

In one aspect, a compound of formula $Mg_aM_bX_y$ for use as electrode material in a magnesium battery is described, wherein the material is a layered crystalline compound having the general formula $Mg_aM_bX_y$, wherein "M" is a metal cation, or mixture of metal cations and "X" is an anion or mixture of anions. In some embodiments, X is oxygen (O), sulfur (S), selenium (Se) or fluoride (F), or mixtures thereof. The structures can have a close-packed lattice of O, S, Se, or F, with layers of octahedrally-coordinated metals that are capable of being oxidized during Mg extraction (for example, selected from the group consisting of V, Cr, Mn, Fe, Co, Ni, Cu, Mo, Nb, Sn, Sb, Bi Ag, or mixtures thereof) alternating with layers of fully or partially occupied magnesium sites. In certain embodiments, M is one or more transitional metals selected from the group consisting of Cr, Mn, Ni, Co, and mixtures thereof; and X is one or more anions selected from the group consisting of O, S, F, and mixtures thereof. In other embodiments, M is one or more transitional metals selected from the group consisting of V, Cr, Mn, Fe, Ni, Co, Cu, Mo, Nb, Sn, Sb, Bi Ag and mixtures thereof; and X is one or more anions selected from the group consisting of O, S, F, and mixtures thereof.

In some embodiments, the compound is in an oxidized state and a is about 0. In some embodiments, the compound is in a reduced state and a is in the range of 1 to 2. In some embodiments, b is about 1 and y is about 2. In other embodiments, b is about 2 and y is about 4. In yet other embodiments, b is about 1 and y is in the range of 2 to 9.

In one or more embodiments, the material includes layered transition metal oxides, sulfides, fluorides, chlorides and selenides, or any mixtures thereof with layers of octahedrally-coordinated transition metals alternating with layers of fully or partially occupied magnesium sites. In particular embodiments, the layered compound include oxides containing transition metals such as V, Cr, Ni, Mn, Co, or mixtures thereof on the transition metal site. Examples of compositions that are able to insert nearly one magnesium ion per two transition metal ions include $CoMn_2O_6$ and $CrS_2$. In other embodiments, the material includes sulfides and selenides containing V, Mn, or Cr as the transition metals. These sulfide and selenide materials provide lower voltage (~0.25 V to ~2.25 V vs. $Mg/Mg^{2+}$) and may also be useful in magnesium insertion anodes or exhibit superior stability in certain electrolytes.

According to another embodiment, the scaffolding ion is N-propyl-N-methylpyrrolidinium (P13) which is electrochemically inserted into layered $V_2O_5$ whereby the layer spacing, relevant for $Mg^{2+}$ diffusion, of the $V_2O_5$ host is expanded.

While various metals are suitable as anodes for the electrolytic solution, including magnesium, aluminum, calcium, yttrium and zirconium, a particularly preferred embodiment of a battery according to the present invention includes the electrolyte according to the present invention, a magnesium metal anode and a magnesium insertion compound cathode.

In some embodiments, the positive electrode layer further comprises an electronically conductive additive. Non-limiting examples of electronically conductive additives include carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, or mesocarbon microbeads.

In some embodiments, the positive electrode layer further comprises a polymer binder. Non-limiting examples of polymer binders include poly-vinylidene fluoride (PVdF), poly (vinylidene fluoride-co-hexafluoropropene) (PVdF-HFP), Polytetrafluoroethylene (PTFE), Kynar Flex 2801, Kynar Powerflex LBG, and Kynar HSV 900, or Teflon.

Negative electrodes used in conjunction with the present invention comprise a negative electrode active material that can accept Mg-ions. Non-limiting examples of negative electrode active material for the Mg battery include Mg, common Mg alloys such as AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, or insertion materials such as Anatase $TiO_2$, rutile $TiO_2$, $Mo_6S_8$, $FeS_2$, $TiS_2$, $MoS_2$. It is believed that alloys of Mg with one or more of the elements Al, Ca, Bi, Sb, Sn, Ag, Cu, and Si can also be used.

In some embodiments, the negative electrode layer further comprises an electronically conductive additive. Non-limiting examples of electronically conductive additives include carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, or mesocarbon microbeads.

In some embodiments, the negative electrode layer further comprises a polymer binder. Non-limiting examples of polymer binders include poly-vinylidene fluoride (PVdF), poly (vinylidene fluoride-co-hexafluoropropene) (PVdF-HFP), Polytetrafluoroethylene (PTFE), Kynar Flex 2801, Kynar Powerflex LBG, and Kynar HSV 900, or Teflon.

In some embodiments, the electrochemical cell used in conjunction with an inorganic electrolyte described herein comprises a positive electrode current collector comprising carbonaceous material or metal coated with carbonaceous material or metal coated with a barrier over-layer providing improved chemical and electrochemical inertness. In some embodiments, the electrochemical cell described herein comprises a negative electrode current collector comprising carbonaceous material or metal coated with carbonaceous material or metal coated with a barrier over-layer providing improved chemical and electrochemical inertness.

In other embodiments, the electrochemical cell described herein comprises positive and negative electrode current collectors comprising carbonaceous material or metal coated with carbonaceous material.

Figure 21:
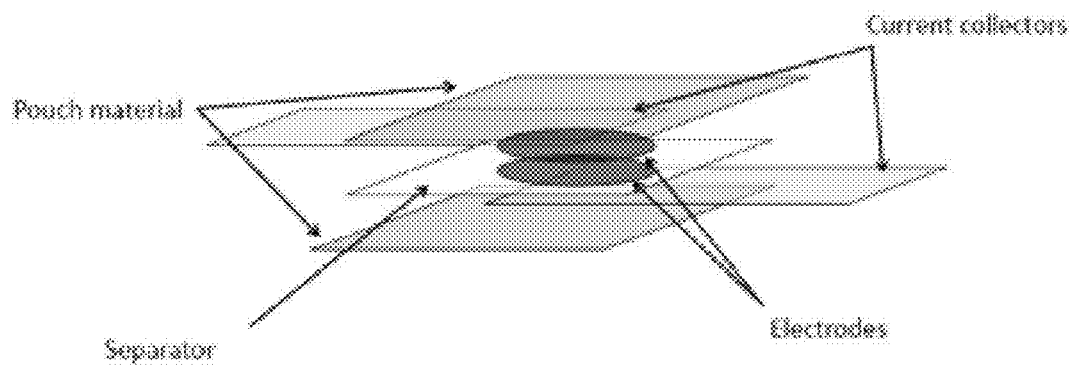
FIG. 21 is a diagram showing a pouch cell design.
Figure 20:
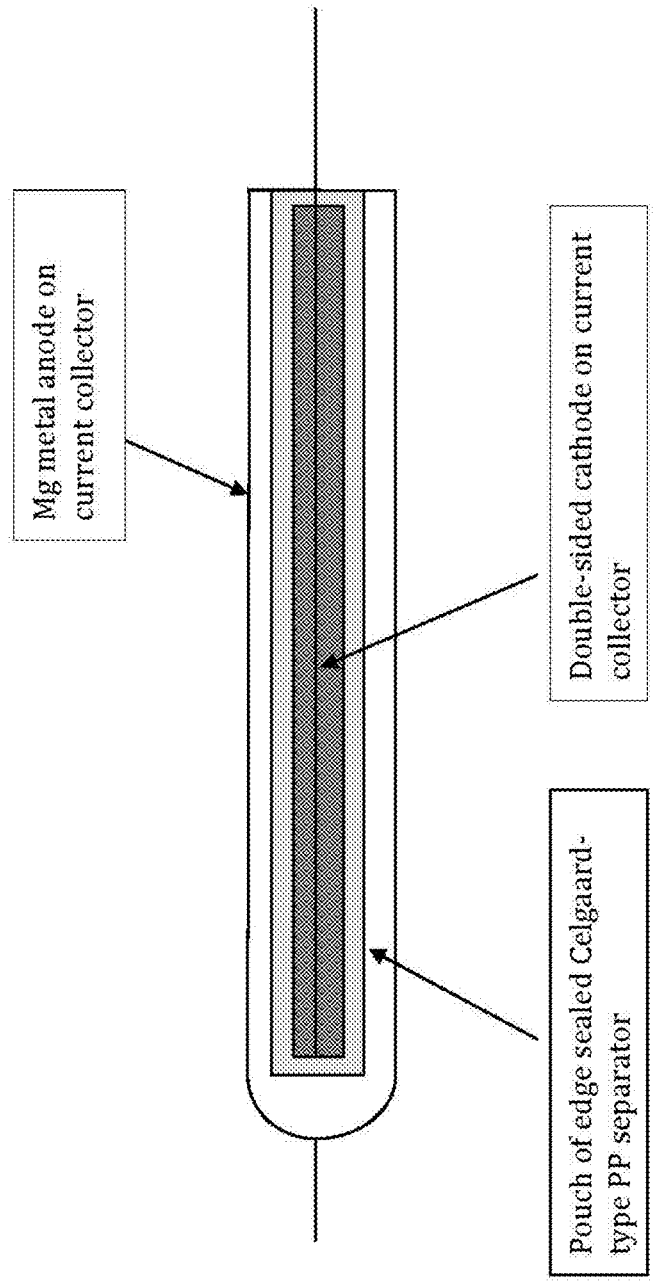
FIG. 20 is a diagram showing a bi-cell design.

FIG. 20 is a diagram showing a bi-cell design. FIG. 21 is a diagram showing a pouch cell design. In some embodiments, the electrochemical cell disclosed herein is a prismatic, or pouch, bi-cell consisting of one or more stacks of a positive electrode which is coated with active material on both sides and wrapped in porous polypropylene or glass fiber separator, and a negative electrode folded around the positive electrode wherein one or both current collectors comprise carbonaceous materials. The stack(s) are folded within a polymer coated aluminum foil pouch, dried under heat and/or vacuum, filled with electrolyte, and vacuum and heat sealed. In some embodiments of the prismatic or pouch cells used in conjunction with the electrolyte described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging.

Figure 22:
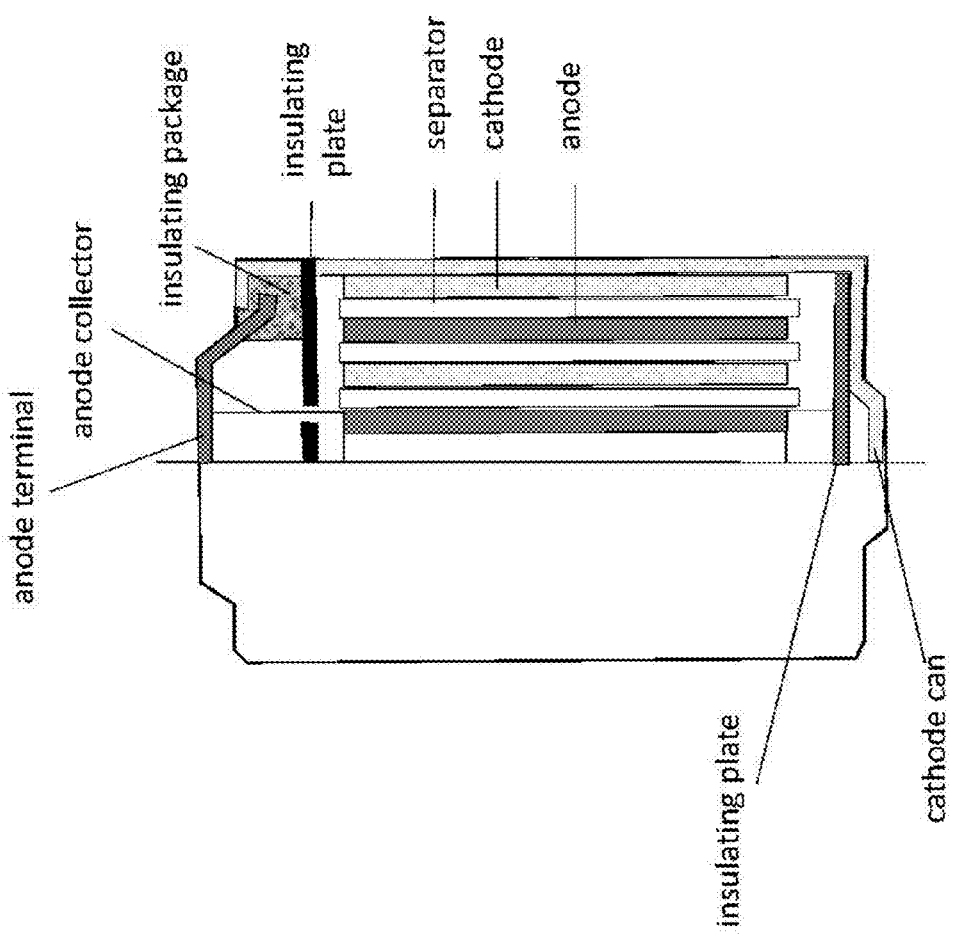
FIG. 22 is a diagram showing a spiral-wound cylindrical cell design.

FIG. 22 is a diagram showing a spiral-wound cylindrical cell design. In some embodiments, the electrochemical cell used in conjunction with the electrolyte disclosed herein is a wound or cylindrical cell consisting of wound layers of one or more stacks of a positive electrode which is coated with active material on one or both sides, sandwiched between layers of porous polypropylene or glass fiber separator, and a negative electrode wherein one or both current collectors comprise carbonaceous materials. The stack(s) are wound into a cylindrical roll, inserted into the can, dried under heat and/or vacuum, filled with electrolyte, and vacuum and welded shut. In some embodiments of the cylindrical cells described herein, an additional tab composed of a metal foil or carbonaceous material, or metal coated with carbonaceous material of the same kind as current collectors described herein, is affixed to the current collector by laser or ultrasonic welding, adhesive, or mechanical contact, in order to connect the electrodes to the device outside the packaging.

Figure 23:
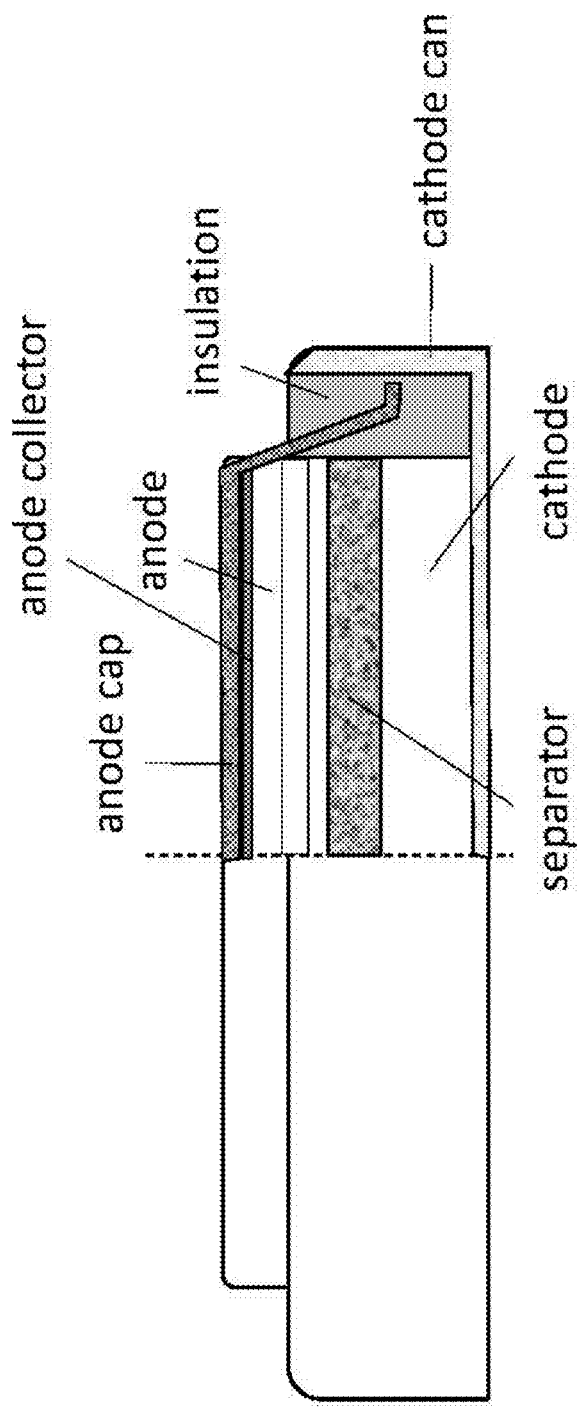
FIG. 23 is a diagram showing a single layer button cell design.

FIG. 23 is a diagram showing a single layer button cell design. In some embodiments, the electrochemical cell disclosed herein is a button or coin cell battery consisting of a stack of negative electrode, porous polypropylene or glass fiber separator, and positive electrode disks sit in a can base onto which the can lid is crimped. In other embodiments, the electrochemical cell used in conjunction with the electrolyte disclosed herein is a stacked cell battery. In other embodiments, the electrochemical cell disclosed herein is a prismatic, or pouch, cell consisting of one or more stacks of negative electrode, porous polypropylene or glass fiber separator, and positive electrode sandwiched between current collectors wherein one or both current collectors comprise carbonaceous materials. The stack(s) are folded within a polymer coated aluminum foil pouch, vacuum and heat dried, filled with electrolyte, and vacuum and heat-sealed.

EXAMPLE 1

This example provides ionic diffusivity data estimated from first-principles nudged-elastic band calculations of Mg mobility in layered $V_2O_5$.

FIG. 1A shows a schematic illustration of a typical layered electrode material where the Mg ions are indicated and the slab inter-layer distance as measured by the metal-metal center distance (slab space) is defined.

Figure 1B:
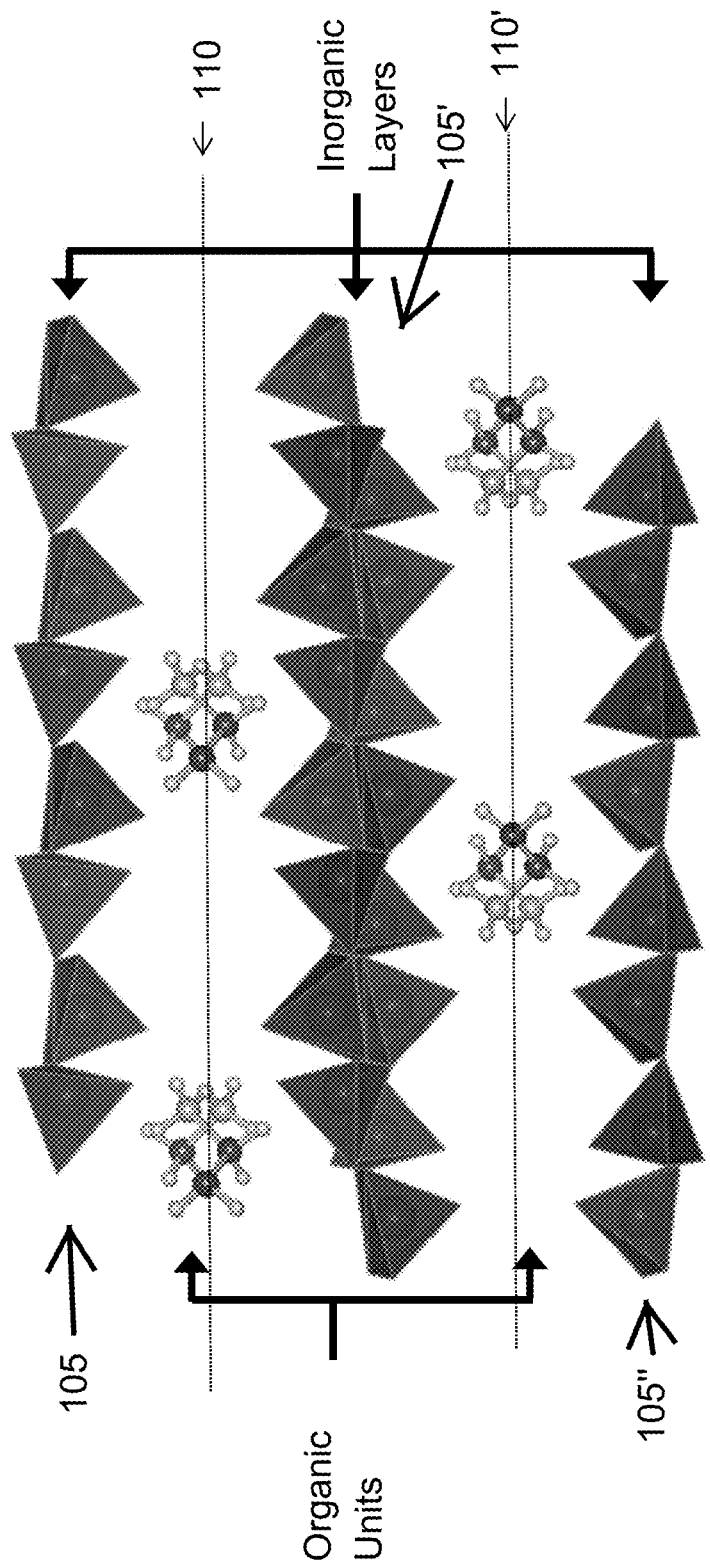
FIG. 1B is a schematic diagram of a layered material having a first plurality of layers of inorganic material separated by a second plurality of units of an organic species situated on intervening planes.

FIG. 1B is a schematic diagram of a layered material having a first plurality of layers of inorganic material 105, 105', 105" separated by a second plurality of units of an organic species situated on intervening planes 110, 110'. The units of the organic species do not necessarily have to provide a layer of contiguous organic units, but rather there need to be enough of such units of the organic species that layers of inorganic material are separated by a distance that is sufficient to allow rapid insertion and removal of multi-valent positive ions such as $Mg^{2+}$, $Al^{3+}$ and other such ions so that charging and discharging of an energy storage device (such as a secondary battery) can be performed at suitable rates, such as C/15, C/10, C/5, or C discharge rates.

Figure 2:
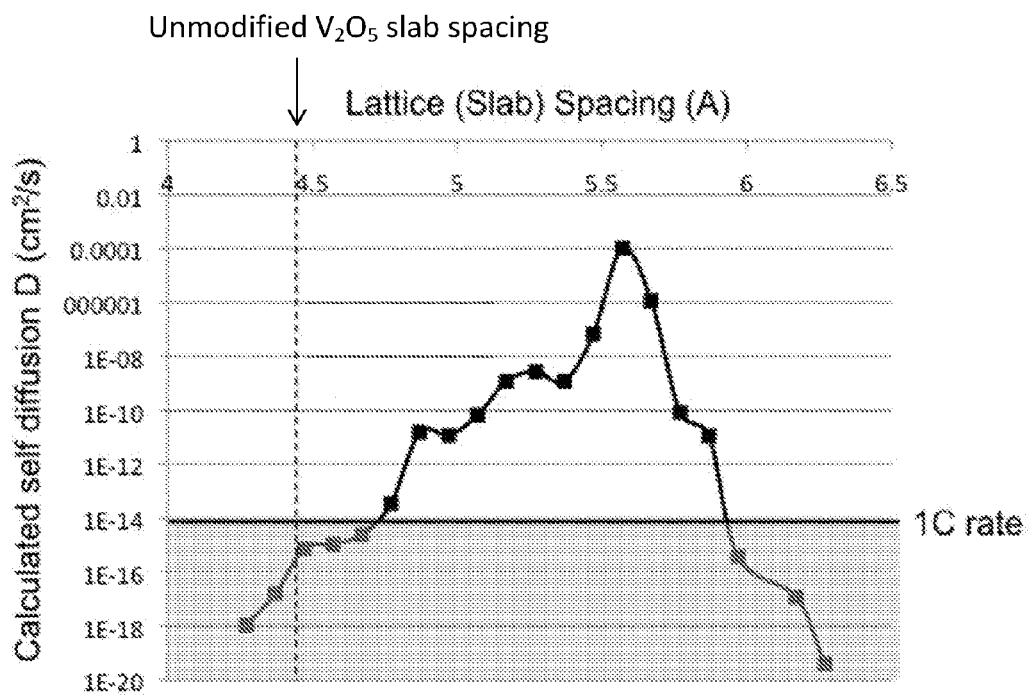
FIG. 2 is a graph of calculated diffusivity by first principles nudged elastic band calculations for a single Mg ion in layered $V_2O_5$ as a function of the metal-metal center layer distance. The equilibrium un-modified materials layer distance is specified as well as the estimated 1C rate performance for a representative 100 nm radius electrode particle.

FIG. 2 shows the estimated dilute-limit diffusivity of a Mg ion moving through the layer of $V_2O_5$ as a function of the slab (layer) space distance. The unmodified slab distance as well as the diffusivity corresponding to 1C rate for a 100 nm electrode particle are indicated.

FIG. 2 exemplifies the strong influence of layer space distance on the Mg diffusivity and that there exist a specific range of layer spacing in $V_2O_5$, e.g., 4.8 Å to 6 Å, for which sufficient Mg mobility (1C) for energy storage applications is enabled. In a preferred embodiment for $V_2O_5$, the range of layer spacing is in the range of 4.8 Å to 6 Å.

EXAMPLE 2

This example provides ionic diffusivity data estimated from first-principles nudged-elastic band calculations of Mg mobility in layered $MnO_2$.

Figure 3:
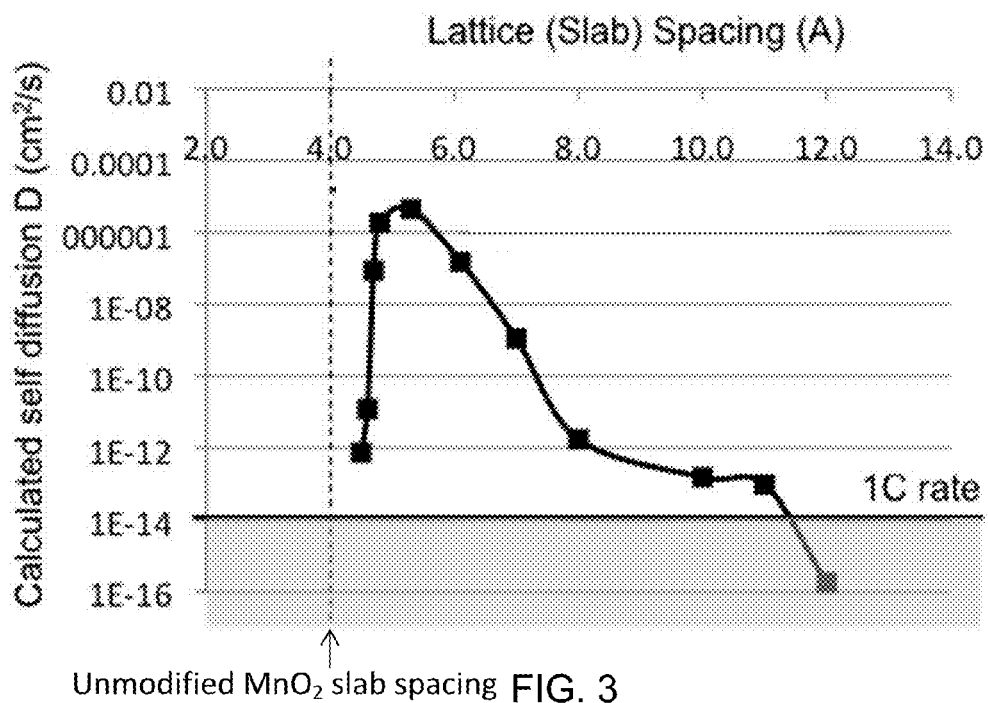
FIG. 3 is a graph of calculated diffusivity by first principles nudged elastic band calculations for a single Mg ion in layered $MnO_2$ as a function of the metal-metal center layer distance. The equilibrium un-modified materials layer distance is specified as well as the estimated 1C rate performance for a representative 100 nm radius electrode particle.

FIG. 3 shows the estimated dilute-limit diffusivity of a Mg ion moving through the layer of $MnO_2$ as a function of the slab (layer) space distance (as defined by FIG. 1A). The unmodified slab distance as well as the diffusivity corresponding to 1C rate for a 100 nm electrode particle are indicated.

FIG. 3 exemplifies the strong influence of layer spacing distance on the Mg diffusivity and that there exist a specific range of layer spacing in $MnO_2$, e.g., 4 Å to 8 Å, for which sufficient Mg mobility (1C) for energy storage applications is enabled.

EXAMPLE 3

This example provides diffusivity data estimated from first-principles nudged-elastic band calculations of Li ion mobility in layered $V_2O_5$.

Figure 4:
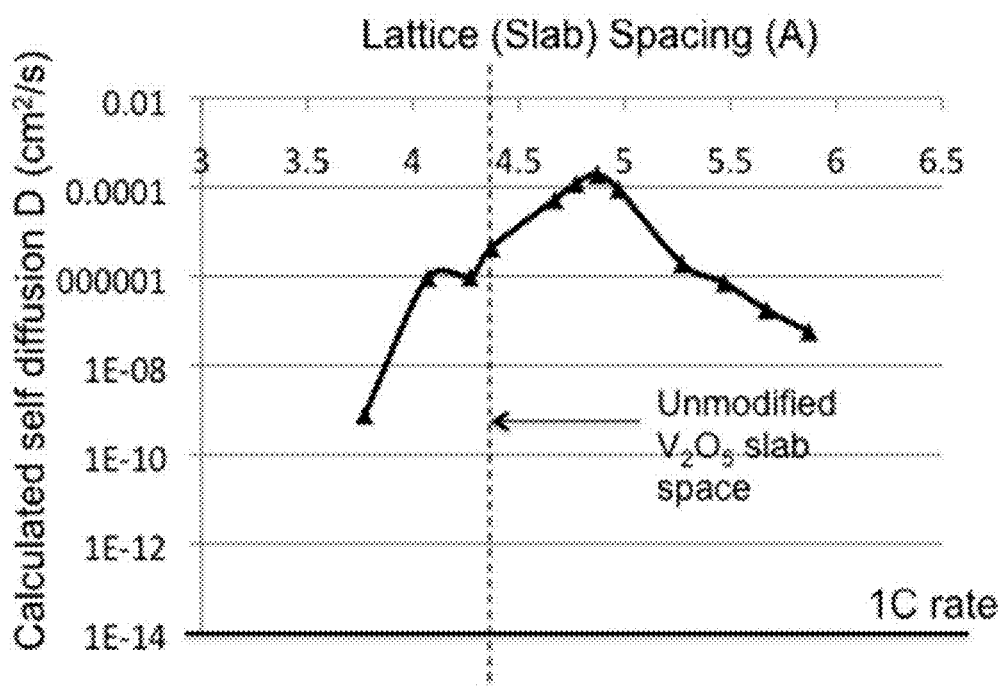
FIG. 4 is a graph of calculated diffusivity by first principles nudged elastic band calculations for a single Li ion in layered $V_2O_5$ as a function of the metal-metal center layer distance. The equilibrium un-modified materials slab layer distance is specified as well as the estimated 1C rate performance for a representative 100 nm radius particle.

FIG. 4 shows the estimated dilute-limit diffusivity of a Li ion moving through the layer of $V_2O_5$ as a function of the slab (layer) space distance (as defined by FIG. 1A) The unmodified slab distance as well as the diffusivity corresponding to 1C rate for a 100 nm electrode particle are indicated.

FIG. 4 exemplifies the that Li ions have good diffusivity irrespective of large changes in layer space distance and that, in contrast to Mg ions, sufficient Li ionic mobility (1C) for energy storage applications is enabled for all reasonable layer space distances. In a preferred embodiment, the range of layer spacing is in the range of 4.8 Å to 5.5 Å.

EXAMPLE 4

This example provides a combined electrochemical, structural, and elemental analysis of cycled cells demonstrating modification of layered $V_2O_5$ through co-intercalation of P13 scaffolding ions which facilitates magnesium intercalation into $V_2O_5$ upon discharge. Thereafter, the electrochemical specific capacity is largely associated with reversible intercalation of Mg.

Figure 7:
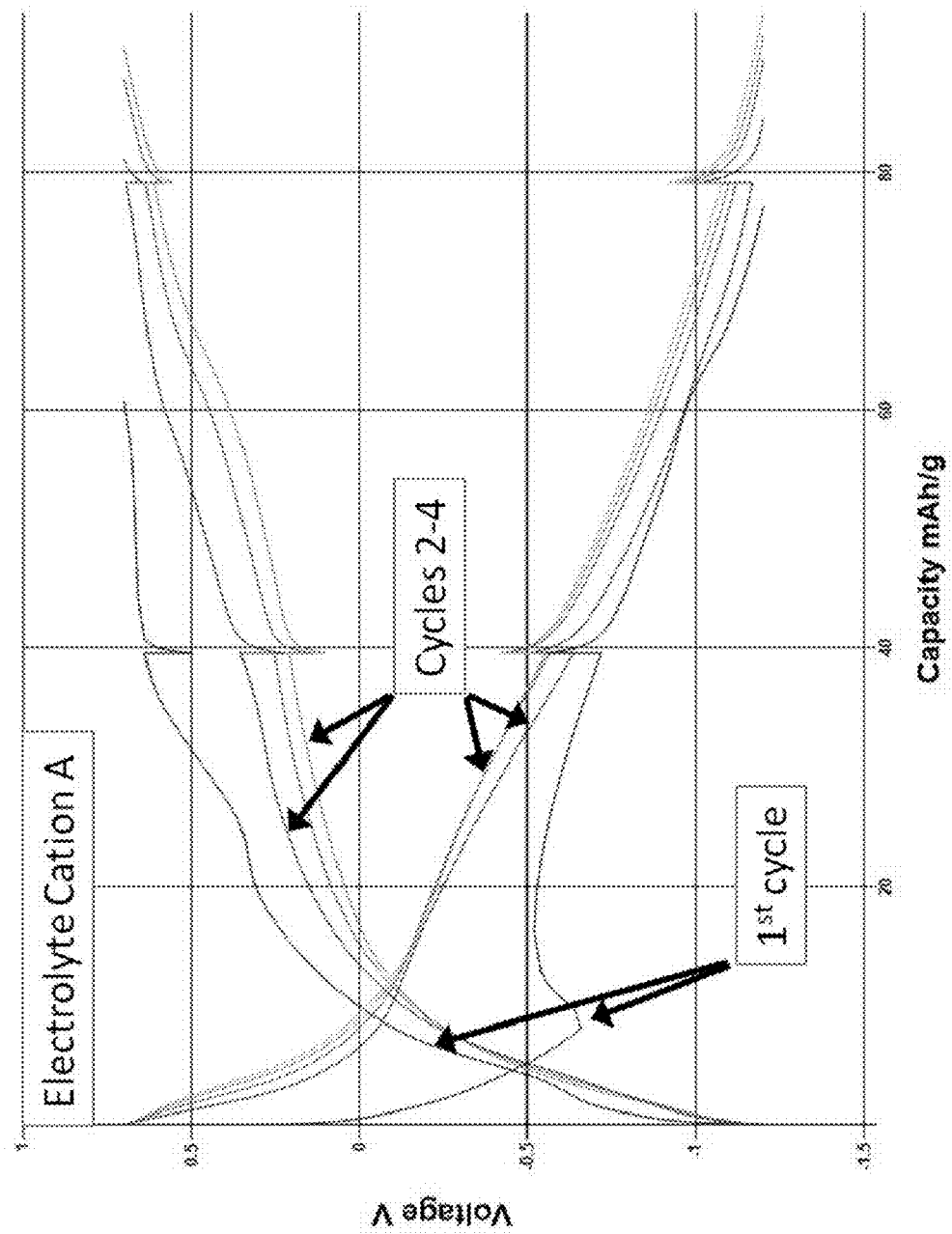
FIG. 7 is a graph of the behavior of a three electrode pouch cell containing a increased-layer spacing modified $V_2O_5$ material incorporated into a working electrode and displaying nucleation of a new "scaffolded" phase due to P13 onium cation co-intercalation during discharge one as compared to subsequent voltage profiles demonstrating facile Mg intercalation. The cell was cycled between −1.2 and 0.7 V versus the Ag/Ag+ quasi-reference at 80° C.

FIG. 7 shows a representative voltage profile of a three electrode pouch cell containing a $V_2O_5$ working electrode in an electrolyte containing both magnesium salt and the scaffolding ion. Cycle 1 discharge demonstrates the nucleation (i.e., temporary 'dip' in voltage) of a new phase due to P13 scaffolding ion co-intercalation. This is in contrast to the subsequent two to four cycles, which no longer demonstrate the nucleation feature, and appear to correspond with facile Mg intercalation. The cell was cycled between −1.2 and 0.7 V versus the $Ag/Ag^+$ quasi-reference.

To confirm that the majority of capacity is due to Mg intercalation six cells containing $V_2O_5$ cathodes and 0.4M Mg-TFSI in P13-TFSI electrolyte were constructed and cycled five times between −1.2 and 0.7 V versus the $Ag/Ag^+$ quasi-reference at 80° C. After cycling each cathode was structurally analyzed with X-ray diffraction (XRD) and elemental analysis (DCP-AES) for quantification of Mg and V. Table 1 shows that four cells were terminated in the discharged state and two cells were terminated in the charged state. For each cell the expected magnesium to vanadium ratio based upon the final specific capacity of the electrochemical cycling is compared to the Mg/V ratio determined through elemental analysis. Elemental analysis confirms magnesium content corresponds well with the charge passed during electrochemical cycling. Fluctuations around the expected Mg/V atomic ratio based on electrochemical testing are within known errors in estimation of cathode mass and residual electrolyte due to incomplete rinsing and similar sources of systematic error. Given the appreciable changes in Mg/V ratios between charge and discharged cells it is clear Mg is being transferred in the electrochemical discharge of these cells.

TABLE 1

Comparison of the Mg/V ratio expected from electrochemical testing of cells and corresponding elemental analysis.

| End State | State of Charge (mAh/g) | Mg/V expected | Mg/V actual (ICP) | Current Density (mA/g) |
|---|---|---|---|---|
| Discharge | 101 | 0.168 | 0.148 | 20 |
| Discharge | 106 | 0.177 | 0.141 | 20 |
| Discharge | 103 | 0.172 | 0.147 | 20 |
| Discharge | 107 | 0.178 | 0.133 | 20 |
| Charge | 0 | 0 | 0.043 | 20 |
| Charge | 0 | 0 | 0.048 | 20 |

Figure 8:
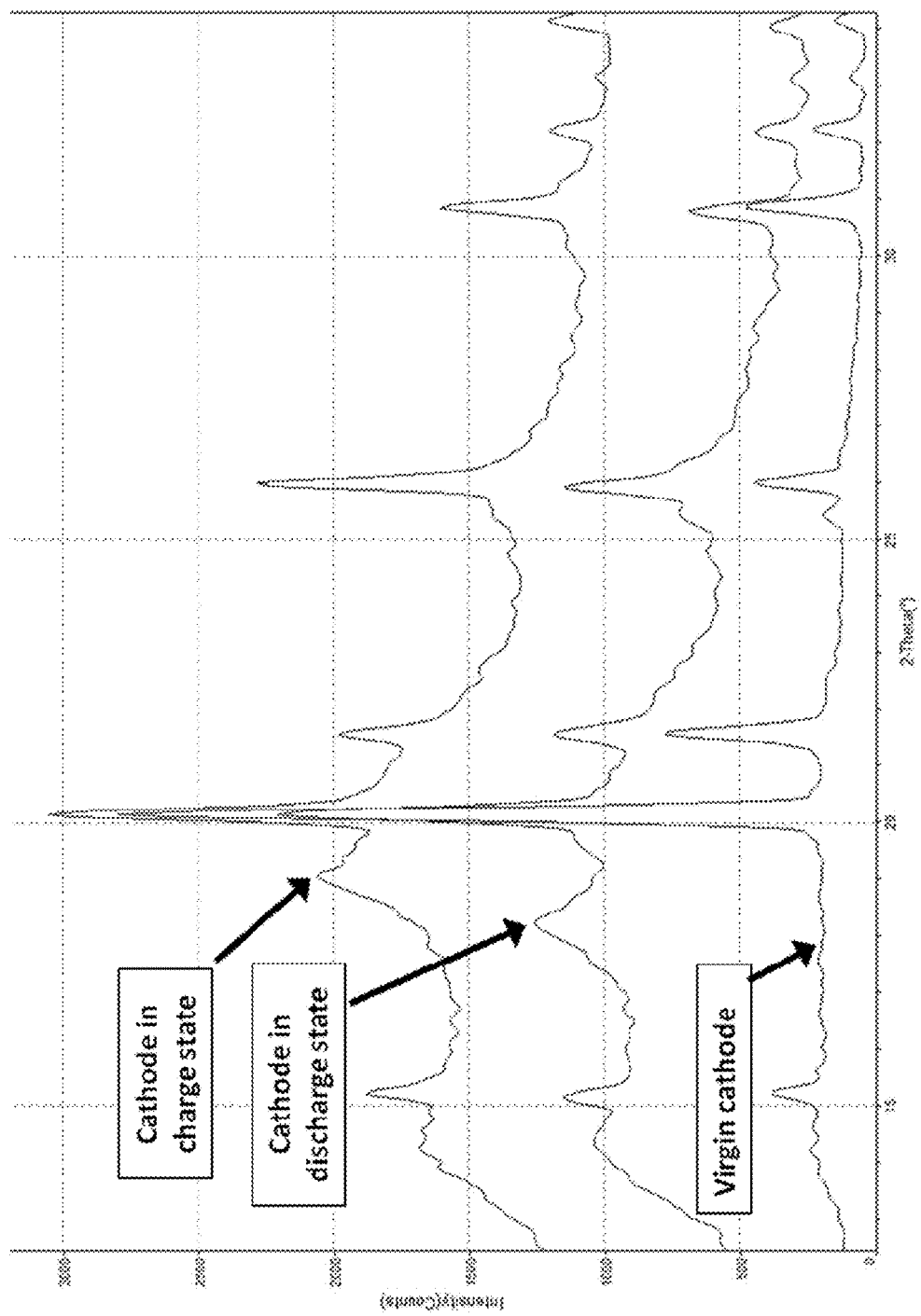
FIG. 8 is a diagram showing the X-ray diffraction (XRD) spectra of increased-layer spacing $V_2O_5$ cathodes cycled in P13-TFSI/Mg-TFSI electrolyte indicating the structural changes corresponding to the modification of the material. For reference, a representative XRD pattern of an electrode containing the un-modified $V_2O_5$ material is shown in comparison to the intercalated (discharged) and de-intercalated (charged) cathode. The cathodes containing the modified materials show a new peak at 18° corresponding to the spreading of the layers within this cathode host structure.

FIG. 8 depicts transitions in the XRD spectra of cells cycled in the P13-TFSI/Mg-TFSI electrolyte. The results confirm structural changes to the interlayer spacing of the host material; $V_2O_5$ in this case. For reference, a representative XRD pattern of a virgin electrode is shown. Upon discharge, a clear diffuse peak (marked by arrows) is observed near 18° 2-theta. Upon charge, the diffuse peak shifts to 19° 2-theta indicating a semi-reversible structural change. Of note, the (200) and (110) peaks of $V_2O_5$ do not appear to shift appreciably, while an attenuation of the (001) peak is observed in both the charged and discharged cells. This is consistent with the layer-spacing modifying ("scaffolding") ion P13 co-intercalating with Mg into $V_2O_5$ layers, and remaining in the $V_2O_5$ host while Mg de-intercalates during charge. Such an effect would modify all (001) reflections more significantly than (hk0) reflections. Additionally, the $V_2O_5$ starting material is clearly not recovered on charge. XRD patterns of charged cells display a diffuse peak at 19° 2-theta.

EXAMPLE 5

Figure 9:
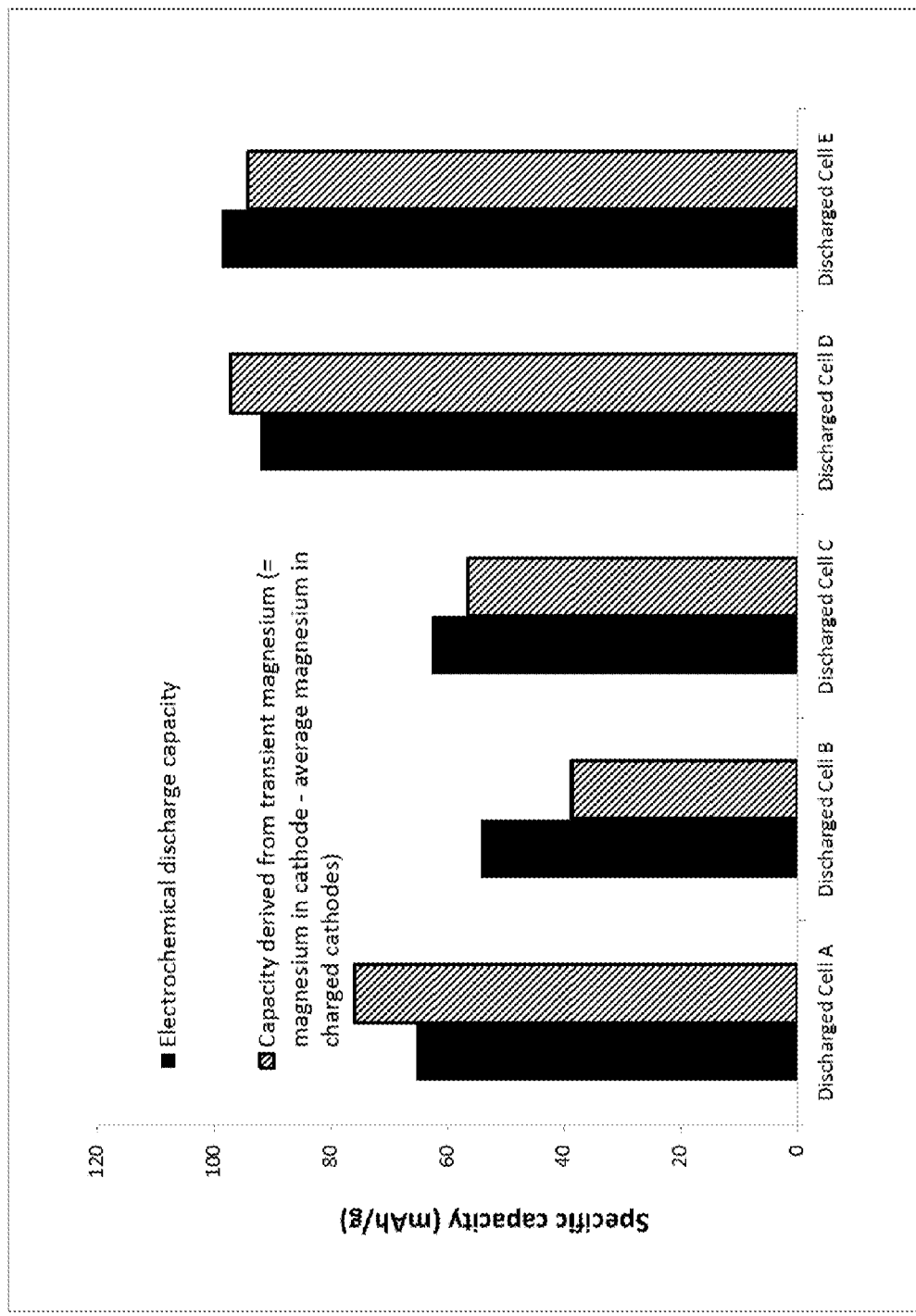
FIG. 9 is a graph that shows the comparison of capacity of discharged cells containing modified layered cathode material to the transient magnesium quantified by elemental analysis.

This example provides a combined electrochemical and elemental analysis of cycled cells demonstrating intercalation of the P13 scaffolding ion into layered cathodes such as $V_2O_5$ is largely irreversible in the presence of magnesium ions and therefore constitutes a stable modification of the cathode host layered structure even during Mg ion cycling. Pouch cells were constructed using layered $V_2O_5$ as the working electrode and an electrolyte containing 0.4 M Magnesium bis(trifluoromethanesulfonyl)imide (MgTFSI) in N-propyl-N-methylpyrrolidinium bis(trifluoromethanesulfonyl)imide (P13 TFSI) as the electrolyte. All cells underwent five galvanostatic cycles at 10 mA/g between −1.2 V and +0.7 V vs. an Ag/Ag$^+$ quasi-reference electrode. The water content was below 150 ppm in the electrolyte. After cycling, or sitting while the remainder of the test set was cycled, the charged, discharged, and non-cycled cells were opened in an Argon filled glovebox, and the cathodes removed and rinsed. All cathodes were analyzed for both nitrogen (by LECO) and magnesium (by DCP-AES) content. For each discharged cell, the amount of magnesium that was actually involved in cycling was calculated from the difference in magnesium content of the particular discharged cathode and the average magnesium content of all the charged cathodes. This difference is known as the transient magnesium content. The amount of transient magnesium in the discharged cathodes (expressed as a capacity) is compared to the actual final discharge capacity that was measured electrochemically in FIG. 9.

Figure 10:
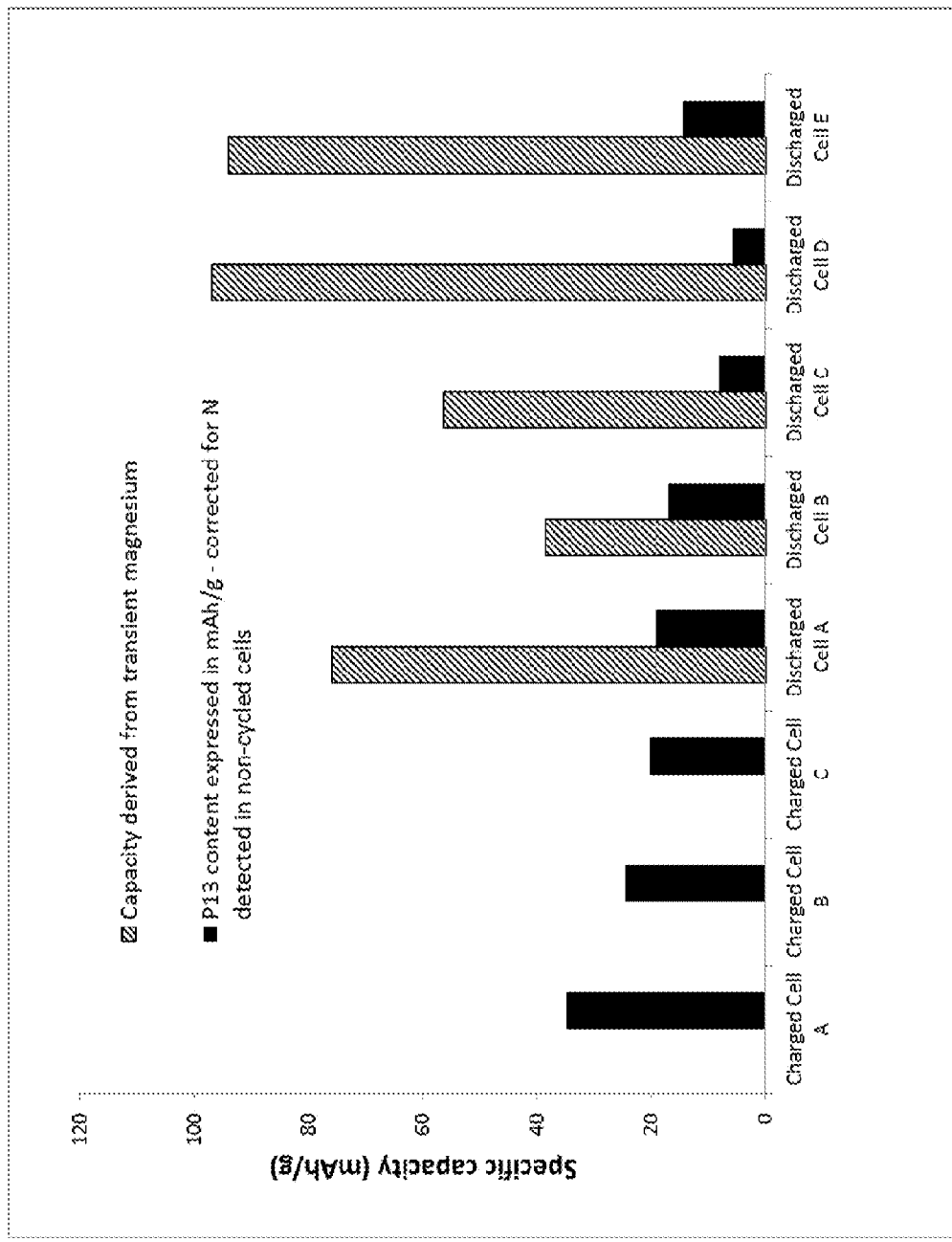
FIG. 10 is a graph that shows the comparison of the scaffolding P13 ion content and the transient magnesium content in charge and discharged cells.

The nitrogen content was also measured for the same cathodes (from charged, discharged and non-cycled cells). The charged and discharged cells are expected to contain nitrogen due to intercalated P13 ions. Although the samples are rinsed, trace electrolyte and sorption of atmospheric nitrogen will influence the quantification of nitrogen content. Therefore non-cycled cells serve as a blank, so the average nitrogen content of the non-cycled cells was subtracted from the nitrogen detected in the charged and discharged cells, to give the amount of nitrogen solely due to intercalated P13 for each of the charged and discharged cells. Note that, as expected, XRD indicates that non-cycled cells did not intercalate P13 simply by immersion in solution. The P13 content derived from the presence of nitrogen in the cathodes can be expressed as specific capacity (mAh/g) by assuming a one electron per P13 inserting into the layered host. FIG. 10 depicts the amount of P13 in the cathodes compared to the amount of transient magnesium. Note that charged cells by definition do not contain any transient magnesium. This data demonstrates that the amount of P13 in the cathodes is very low relative to the amount of transient magnesium.

EXAMPLE 6

This example provides a combined electrochemical and elemental analysis of cycled cells demonstrating intercalation of the P13 onium ion into layered cathodes such as $V_2O_5$ is largely irreversible even in the absence of magnesium ions.

Pouch cells were constructed using layered $V_2O_5$ as the working electrode and an electrolyte containing N-propyl-N-methylpyrrolidinium bis(trifluoromethanesulfonyl)imide (P13 TFSI) as the electrolyte with no Mg salt in the electrolyte. An Ag/Ag$^+$ quasi-reference electrode was also employed.

Figure 11:
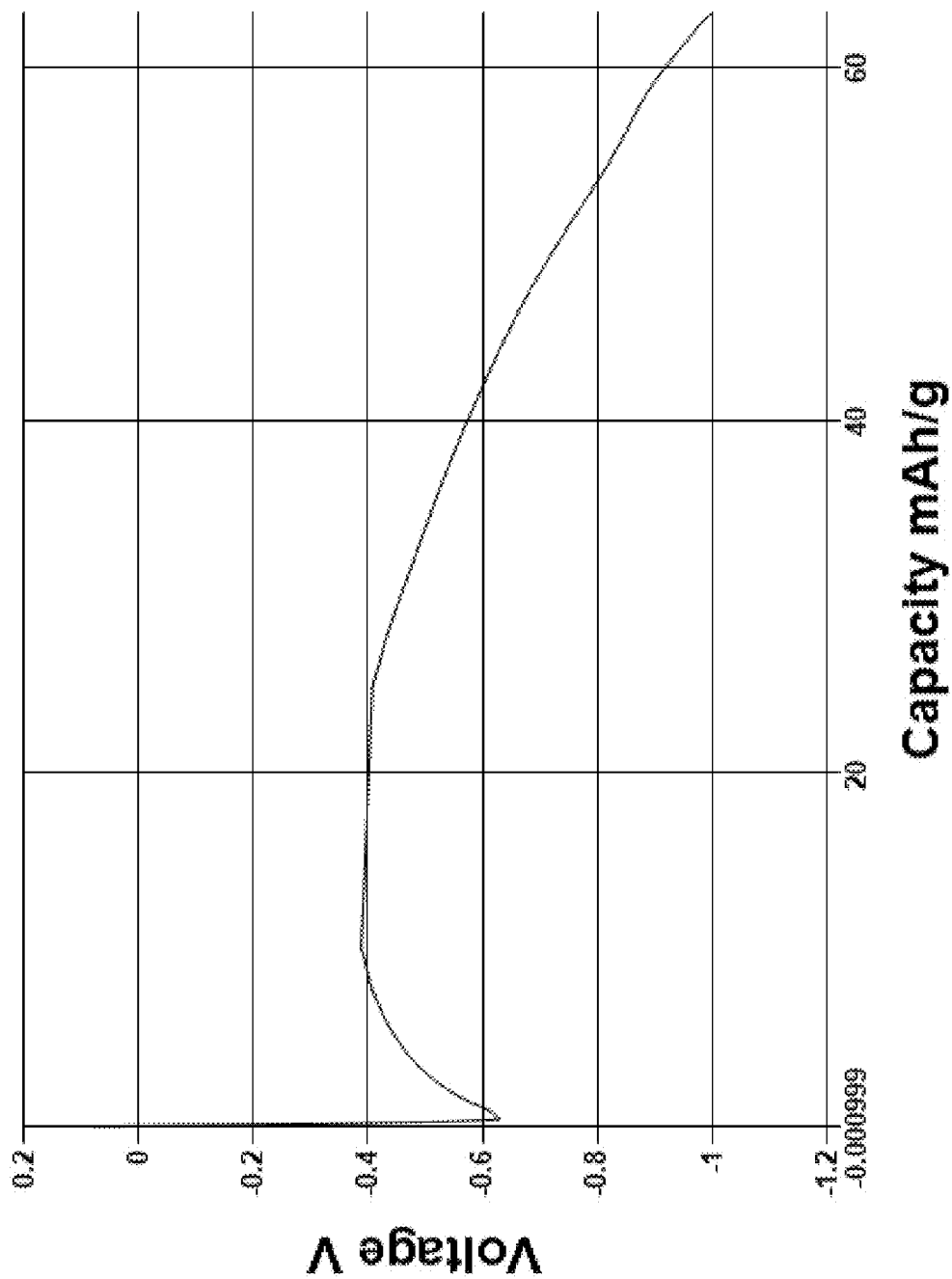
FIG. 11 is a graph that demonstrates the voltage profile of a cell with a $V_2O_5$ layered cathode material in an electrolyte containing only the scaffolding ion P13 in TFSI, and no magnesium salt. The voltage is measured versus the Ag/Ag+ quasi-reference.

FIG. 11 shows the discharge of the cell containing $V_2O_5$ in electrolyte containing P13, but no Mg salt. This cell is discharged to −1 V vs. Ag/Ag$^+$ quasi-reference electrode. The discharge capacity is approximately 60 mAh/g and is attributed to intercalation of the onium ion (P13) as no Mg was present in the cell.

Figure 12:
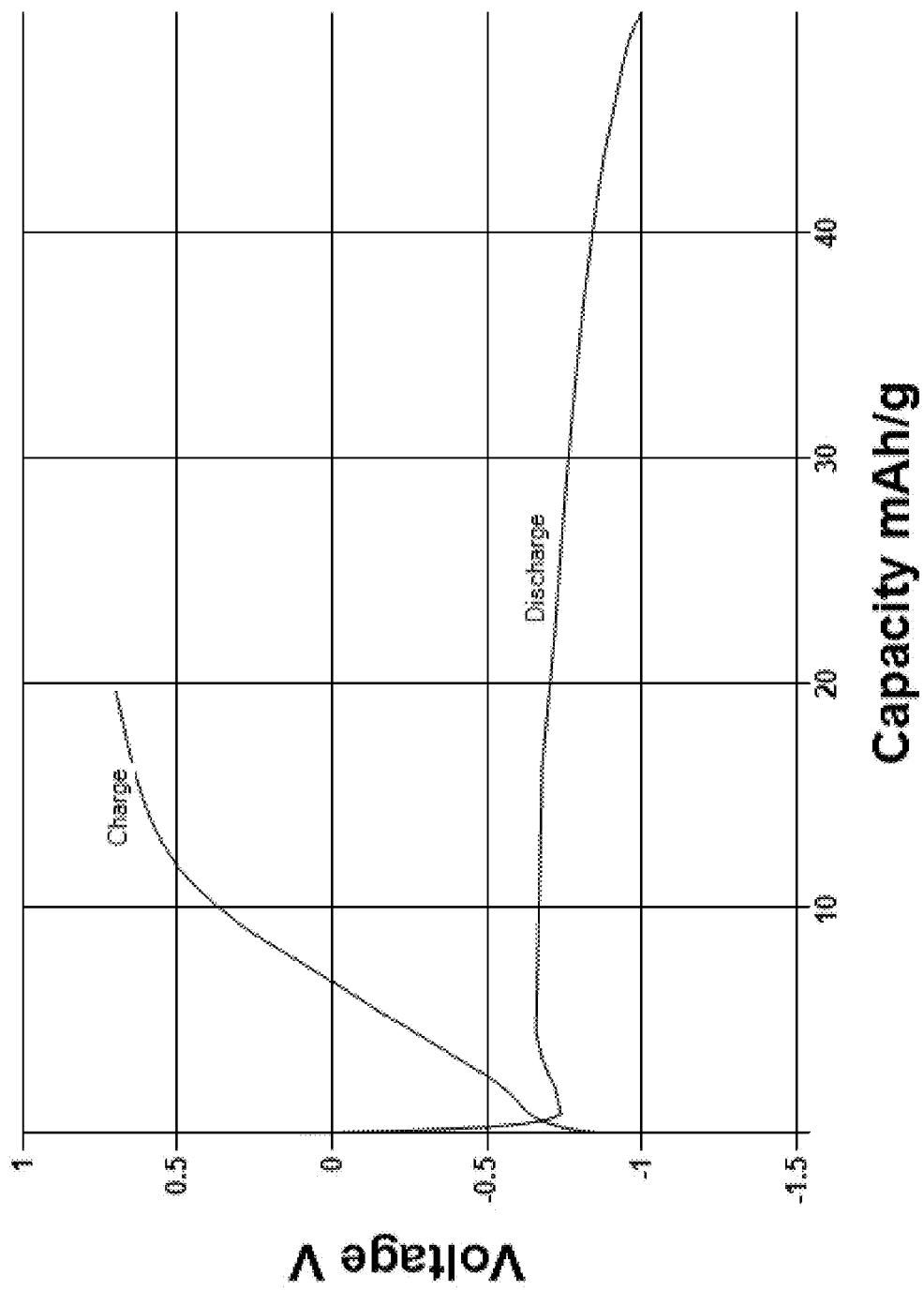
FIG. 12 is a graph that shows the voltage profile for the first discharge and subsequent charge of a cell with a $V_2O_5$ layered cathode material in an electrolyte containing P13-TFSI in the electrolyte, but no magnesium salt. The voltage is measured vs. an Ag/Ag+ quasi-reference electrode. The cell was discharged to −1 V (vs. Ag quasi) and charged to 0.7 V (vs. Ag quasi) galvanostatically at 200 mA/g. A discharge capacity of approximately 60 mAh/g, and a subsequent charge of 20 mAh/g are observed, which are attributed to semi-reversible intercalation of the onium cation (P13).

Similarly FIG. 12 shows the discharge and subsequent charge of a cell containing $V_2O_5$ cathode. The cell is first discharged to −1 V vs. Ag/Ag$^+$ quasi-reference electrode and subsequently charged to 0.7 V vs. Ag/Ag$^+$ quasi-reference galvanostatically at 200 mA/g. The discharge capacity is approximately 60 mAh/g while the subsequent charge capacity is 20 mAh/g thus demonstrating that the majority of intercalation due to the P13 onium ion is irreversible.

Figure 13:
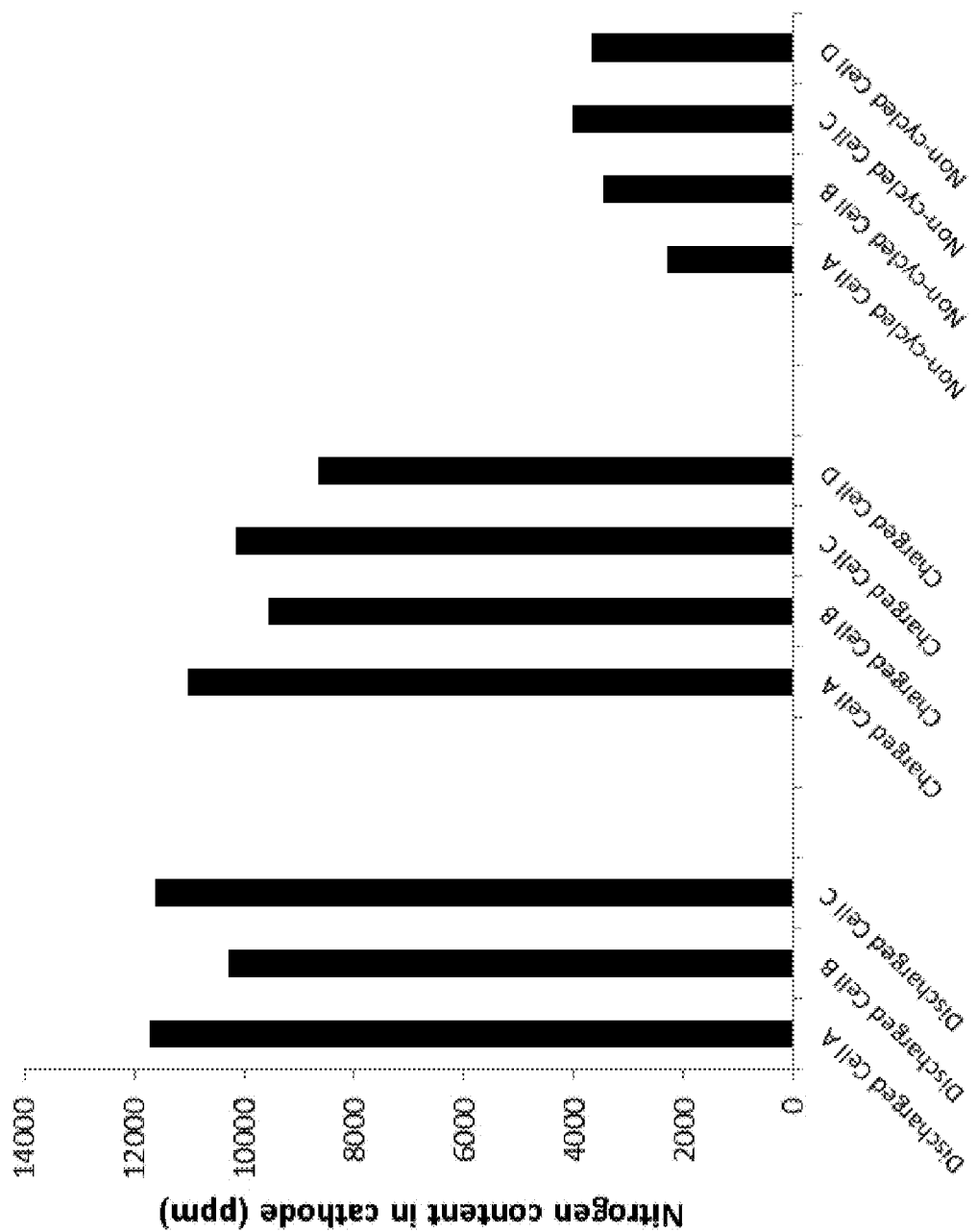
FIG. 13 is a graph that shows a comparison of the nitrogen content in cathodes of cycled cells (ending in both discharged and charged states) and non-cycled cells (i.e., only soaked in electrolyte containing P13-TFSI). Nitrogen content is quantified using LECO time-of-flight mass spectrometry.

Subsequently, the $V_2O_5$ cathodes from the cells with voltage profiles displayed in FIG. 11 and FIG. 12 were analyzed along with similar cells for nitrogen content using LECO time-of-flight-mass spectrometry. The aim was is to determine if there are elevated nitrogen levels in the cathode due to intercalation of P13. Each P13 ion contains one nitrogen atom and there is no other appreciable nitrogen source within these cells. FIG. 13 illustrates that cycled cells (both those that end in discharge and charge) contain significantly more nitrogen than the non-cycled cells thus providing additional evidence that P13 and other onium ions irreversibly intercalate into layered materials.

Figure 14:
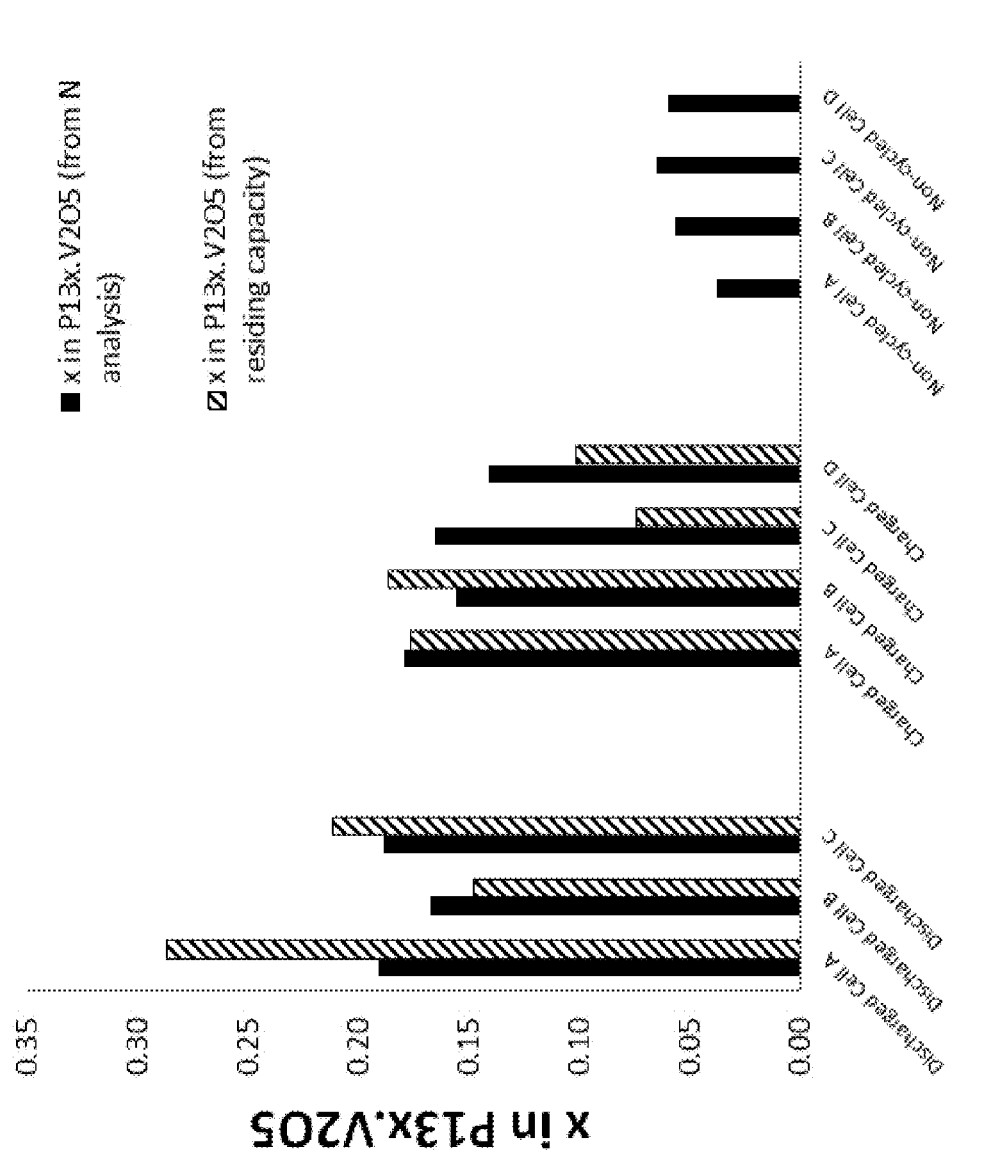
FIG. 14 is a graph that provides an estimate for the quantity of P13 onium cation (i.e., $P13_xV_2O_5$) in the $V_2O_5$ host derived from the ppm level of nitrogen relative to the vanadium content in the electrode. It is compared to the amount of P13 estimated to be in the cathode based upon residing cell capacity (i.e. capacity associated with Coulombic inefficiency).

The amount of P13 in the $V_2O_5$ host can be estimated and expressed as $P13_xV_2O_5$ by converting the measured quantity (ppm) of nitrogen to an absolute amount assuming the mass of the cathode is known and entirely consumed during LECO analysis. FIG. 14 provides comparison of these P13 content values to the amount of P13 estimated to be in the cathode based on cell capacity. It should be noted that these estimates of x in $P13_xV_2O_5$ constitute a maximum bound because the specific capacities may be inflated by side (parasitic) electrochemical reactions while the N content may be high if residual electrolyte remains on the sample, or by the sorption of $N_2$ from the atmosphere. Note that the non-cycled cells also returned positive N values. Nonetheless, as an approximation, FIG. 14 demonstrates that x≈0.16, or 0.1 if one corrects for the N levels detected in the non-cycled cells.

EXAMPLE 7

This example provides evidence of that the desired modifications of the layer spacing can be achieved using a variety of different ions that scaffold the host electrode layer. Similarly, after co-intercalation the electrochemical specific capacity is largely associated with reversible intercalation of Mg while the scaffolding ion remains within the layers of $V_2O_5$.

Figure 15:
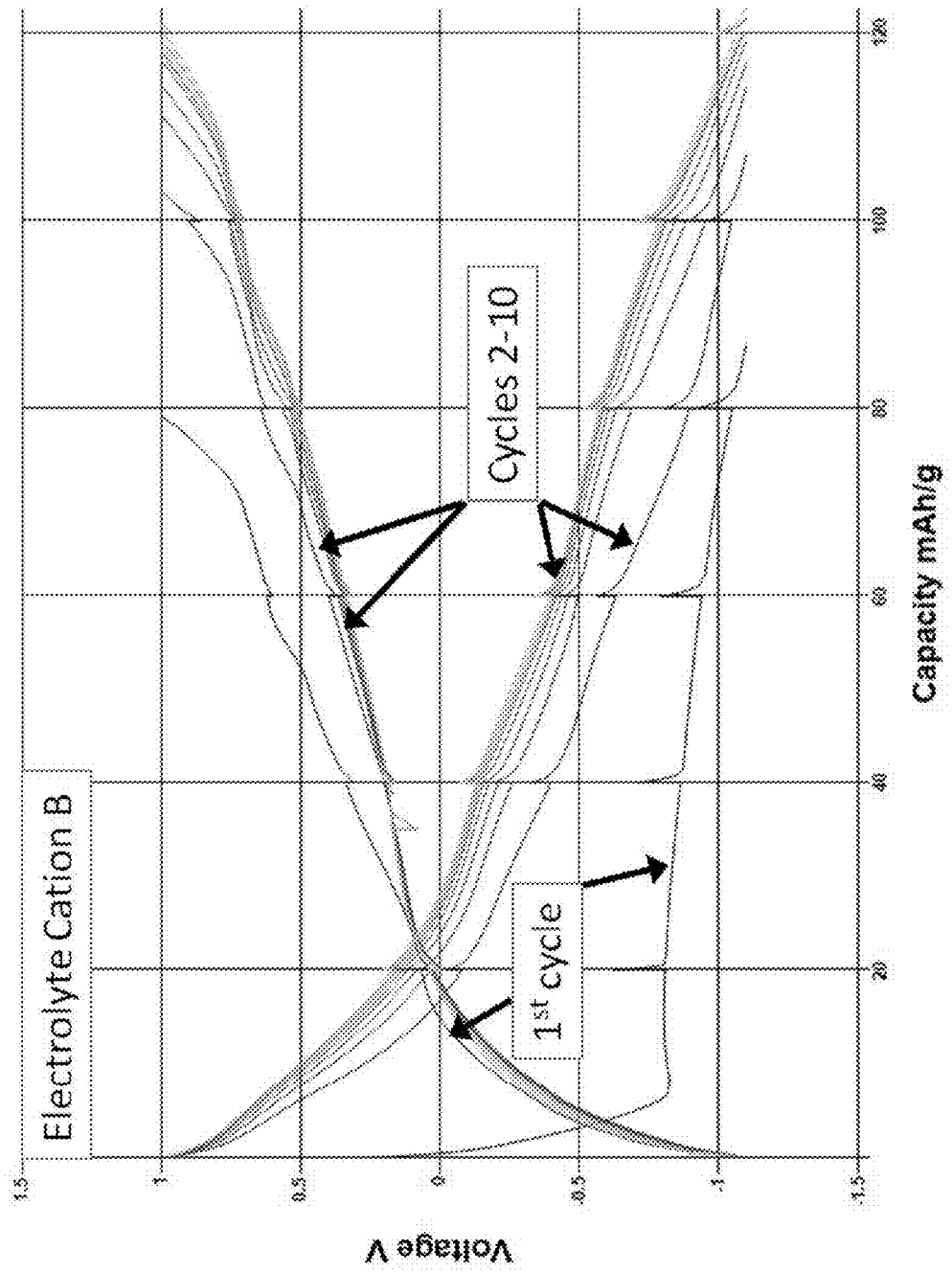
FIG. 15 is a graph that depicts the voltage profile of an electrode pouch cell containing a $V_2O_5$ working electrode and displaying nucleation of a new phase due to ethyl-dimethyl-propyl-ammonium "N1123" scaffolding ion co-intercalation during discharge one as compared to subsequent voltage profiles demonstrating facile Mg intercalation. The cell was cycled between −1.2 and 0.7 V versus the Ag/Ag+ quasi-reference at room temperature.

FIG. 15 shows a representative voltage profile of a three electrode pouch cell containing a layered $V_2O_5$ working electrode in an electrolyte containing both a magnesium salt and scaffolding ions that can modify the layer spacing by irreversible intercalation. The cycle 1 discharge shows nucleation of a new phase due to the scaffolding ion co-intercalation. This is in contrast to the subsequent two to ten cycles, which no longer demonstrate the nucleation feature, and appear to correspond with facile Mg intercalation. The cell was cycled between −1.2 and 0.7 V versus the Ag/Ag$^+$ quasi-reference. The ion utilized to modify the layer spacing (scaffold) of the electrode material in this cell is ethyl-dimethyl-propyl-ammonium "N1123."

Figure 16:
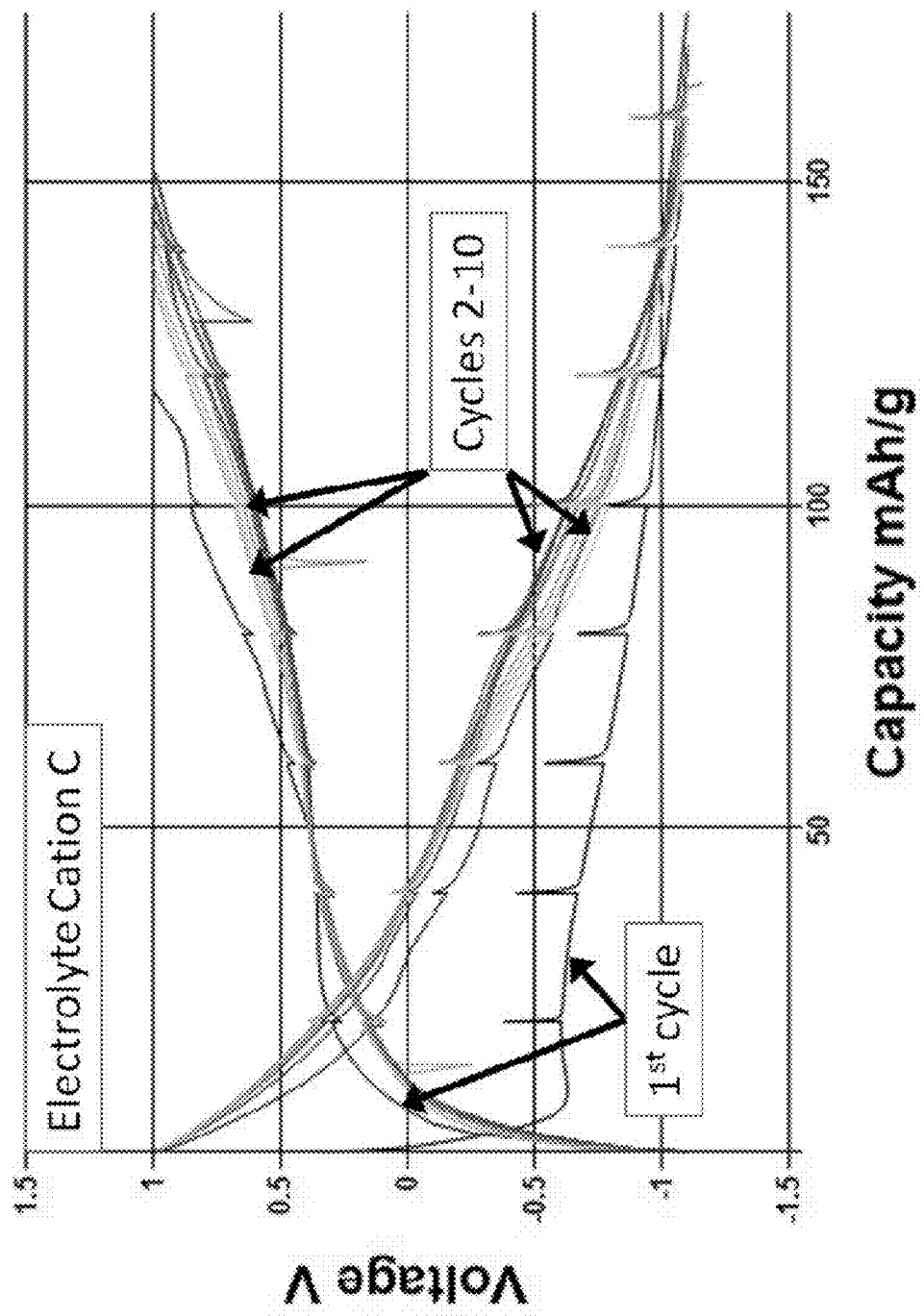
FIG. 16 is a graph that depicts the voltage profile of a electrode pouch cell containing a $V_2O_5$ working electrode and displaying nucleation of a new phase due to 1-butyl-2,3-dimethylimidazolium "BDMI" scaffolding (onium) cation co-intercalation during discharge one as compared to subsequent voltage profiles demonstrating facile Mg intercalation. The cell was cycled between −1.2 and 0.7 V versus the Ag/Ag+ quasi-reference at room temperature.

FIG. 16 shows a representative voltage profile of a three electrode pouch cell containing a layered $V_2O_5$ working electrode in an electrolyte containing both a magnesium salt and ions that can scaffold the layer spacing by irreversible intercalation. The cycle 1 discharge shows nucleation of a new phase due to the scaffolding ion co-intercalation. This is in contrast to the subsequent two to ten cycles, which no longer demonstrate the nucleation feature, and appear to correspond with facile Mg intercalation. The cell was cycled between −1.2 and 0.7 V versus the Ag/Ag$^+$ quasi-reference. The scaffolding ion utilized in this cell is 1-butyl-2,3-dimethylimidazolium "BDMI."

EXAMPLE 8

This example provides evidence of concomitant scaffolding ion and magnesium cation intercalation into layered cathode materials other than $V_2O_5$ using scaffolding ions (i.e., P13). Similar to the $V_2O_5$ cells, after co-intercalation the electrochemical specific capacity is expected to be largely associated with reversible intercalation of Mg while the scaffolding ion remains within the layers of $V_2O_5$.

Figure 17:
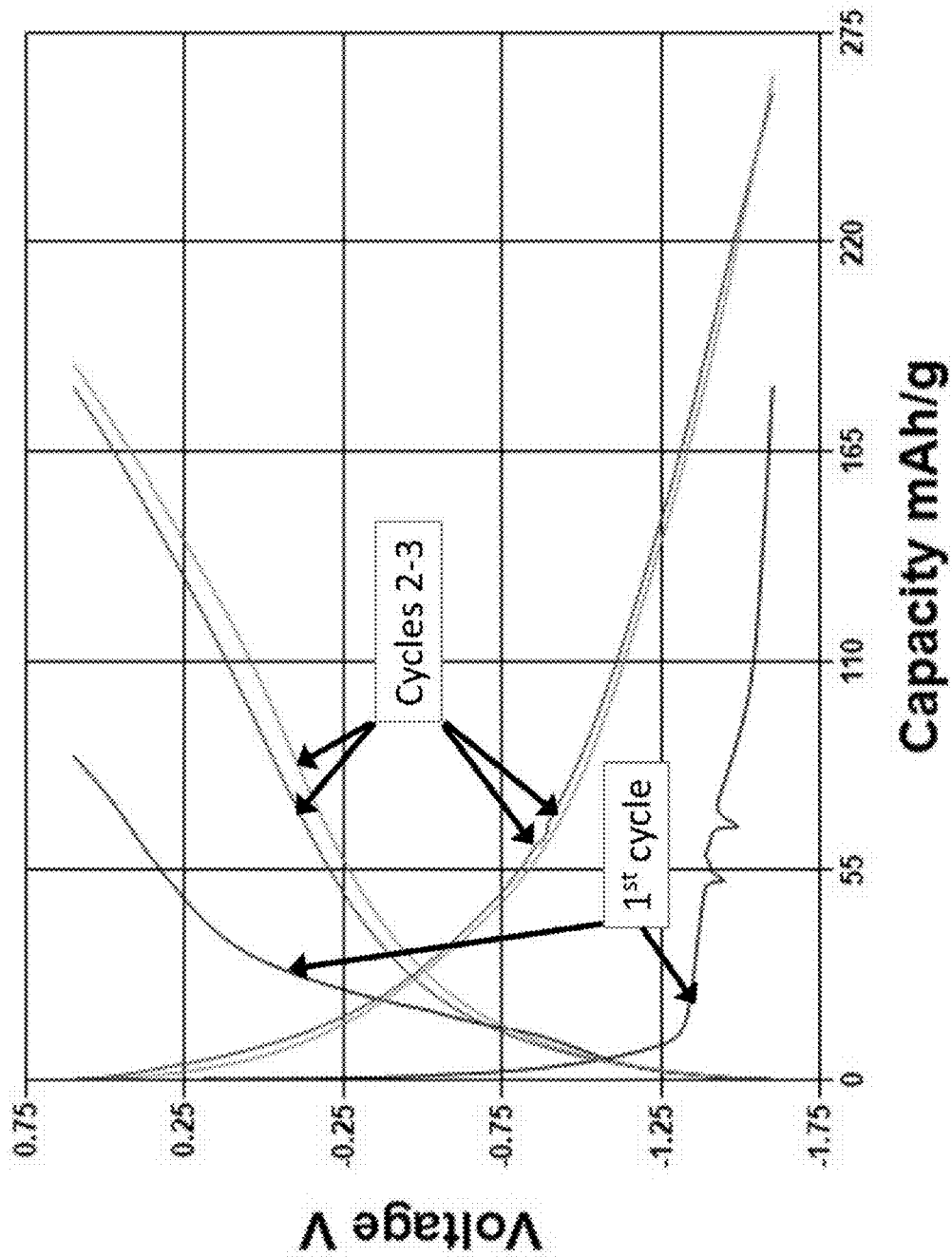
FIG. 17 is a graph that depicts the voltage profile of a electrode pouch cell containing a layered $MoO_3$ working electrode and displaying nucleation of a new phase due to structural modification ("scaffolding") of the layered structure using the P13 co-intercalation during the first discharge and subsequent voltage profiles demonstrating facile Mg intercalation. The cell was cycled between −1.2 and 0.7 V versus the Ag/Ag+ quasi-reference at room temperature.

FIG. 17 shows a representative voltage profile of a three electrode pouch cell containing a layered, orthorhombic phase, $MoO_3$ working electrode in an electrolyte containing both magnesium salt and the P13 scaffolding ion. The cycle 1 discharge shows nucleation of a new phase due to the P13 scaffolding ion co-intercalation. This is in contrast to the subsequent cycles two and three, which also no longer demonstrate the nucleation feature, and appear to correspond with facile Mg intercalation. The cell was cycled between −1.6 and 0.6 V versus the Ag/Ag$^+$ quasi-reference.

Figure 18:
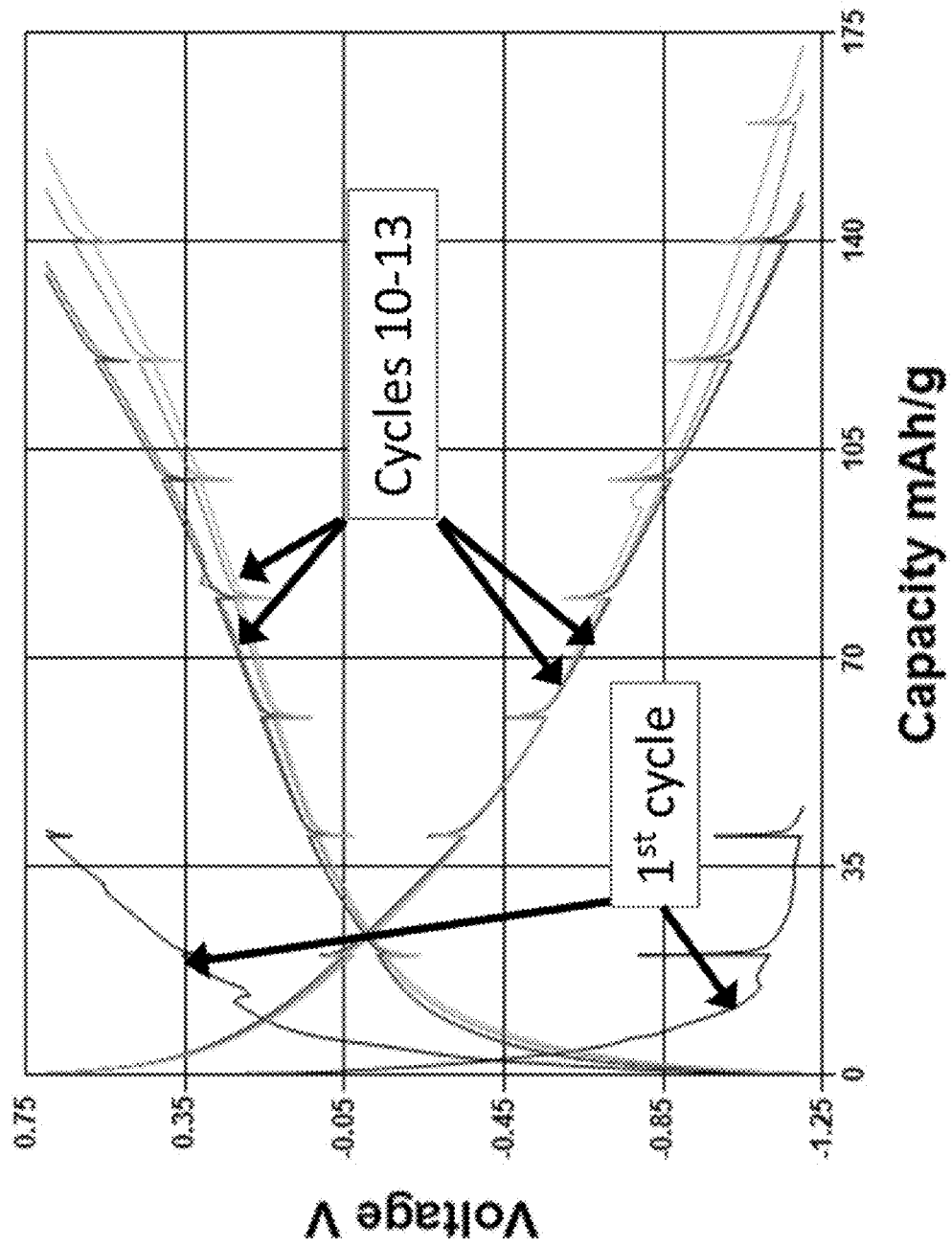
FIG. 18 is a graph that depicts the voltage profile of a pouch cell containing a layered $LiV_3O_8$ working electrode and displaying nucleation of a new modified P13-LiV$_3$O$_8$ due to co-intercalation with the scaffolding P13 onium cation of the layered structure during the first discharge. Subsequent voltage profiles demonstrating facile Mg intercalation. The cell was cycled between −1.2 and 0.7 V versus the Ag/Ag$^+$ quasi-reference at room temperature.

FIG. 18 shows a representative voltage profile of a three electrode pouch cell containing a layered $LiV_3O_8$ working electrode in an electrolyte containing both a magnesium salt and scaffolding ions. The cycle 1 discharge shows nucleation of a new phase due to the P13 scaffolding cation co-intercalation. This is in contrast to the subsequent two to ten cycles, which no longer demonstrate the nucleation feature, and appear to correspond with facile Mg intercalation. The cell was cycled between −1.2 and 0.7 V versus the Ag/Ag$^+$ quasi-reference.

EXAMPLE 9

Figure 19:
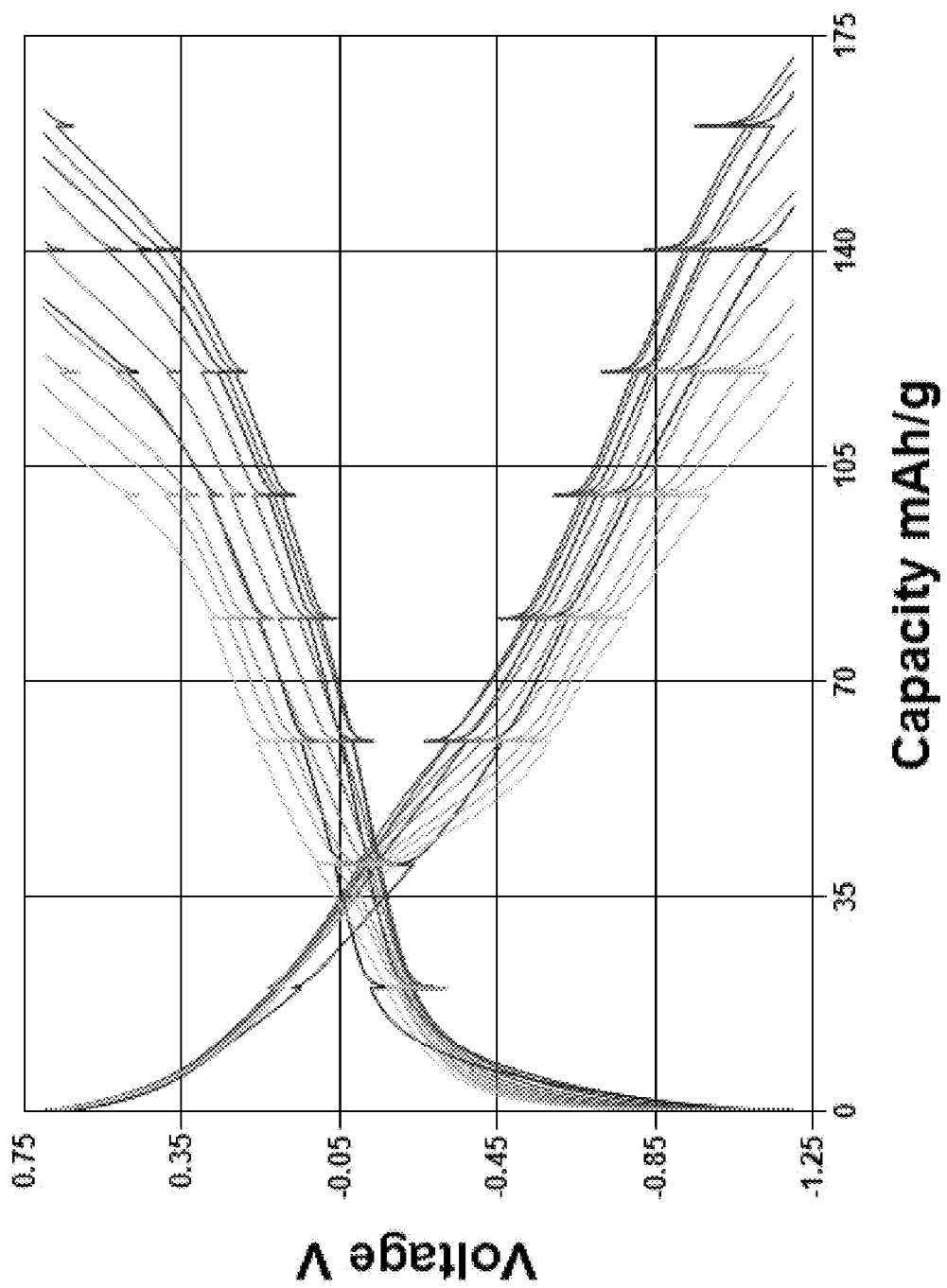
FIG. 19 is a graph that depicts the voltage profile of a pouch cell containing a scaffolded layered P13$_x$V$_2$O$_5$ synthesized via ex-situ reaction, which demonstrates high specific capacity during galvanostatic cycling. Note this electrolyte contains no additional onium ion.

This example presents demonstration of a process for ex-situ structural modification of a layered cathode material wherein scaffolding ions insert between the layers of a material such as $V_2O_5$. A typical reaction involves adding 0.50 grams (0.0027 moles) of $V_2O_5$, 0.56 grams (0.0014 moles) of N-methyl, N-propyl pyrrolidinium bis(trifluoromethanesulfonyl)imide (P13TFSI) and 3 ml of Ethanol in a 500 ml beaker. Subsequently, with vigorous stirring, 10 ml of 35 wt % $H_2O_2$ is added dropwise to the mixture at room temperature. The reaction is very exothermic and is completed in less than 5 minutes. The product is then collected and allowed to air dry overnight. FIG. 19 depicts the voltage profile for the first ten cycles of a cell containing ex-situ synthesized $P13_xV_2O_5$ as the active cathode material and an electrolyte containing only MgTFSI salt (i.e., no scaffolding ions). Note that no nucleation features are observed during the first cycle discharge and facile magnesium intercalation is observed. This data was collected employing galvanostatic cycling and the voltage is measure using an Ag/Ag$^+$ quasi-reference electrode was also employed.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An energy-storage apparatus, comprising:
   an anode configured to accept Mg ions from an electrolyte and to release Mg-ions to said electrolyte, said anode having at least one anode electrical connection on an external surface of said energy-storage apparatus, and having at least one anode surface within said energy-storage apparatus;

a cathode comprising a layered crystalline compound comprising a transition metal, said layered crystalline compound having a modified layer spacing such that an interlayer metal-metal distance in said layered crystalline compound is 4.8 Angstrom or more, said layered crystalline compound having at least one cathode electrical connection on an external surface of said energy-storage apparatus and having at least one cathode surface within said energy-storage apparatus; and said electrolyte comprising a magnesium-bearing electrolyte in contact with said at least one anode surface within said energy-storage apparatus, and in contact with said at least one cathode surface within said energy-storage apparatus.

2. The energy-storage apparatus of claim 1, wherein said cathode comprising a layered crystalline compound comprises a compound having the chemical formula $Mg_aM_bX_y$, wherein M is a metal cation or a mixture of metal cations, X is an anion or mixture of anions, a is in the range of 0 to about 2, b is in the range of about 1 to about 2, and $y \leq 9$.

3. The energy-storage apparatus of claim 1, wherein at least one of said anode and said cathode further comprises an electronically conductive additive.

4. The energy-storage apparatus of claim 1, wherein at least one of said anode and said cathode further comprises a polymer binder.

5. The energy-storage apparatus of claim 1, wherein said anode configured to accept and release Mg-ions comprises a material selected from the group consisting of Mg, Mg alloys AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, and Mg alloys containing at least one of the elements Al, Ca, Bi, Sb, Sn, Ag, Cu, and Si.

6. The energy-storage apparatus of claim 1, wherein said anode configured to accept and release Mg-ions comprises insertion materials including one or more of Anatase $TiO_2$, rutile $TiO_2$, $Mo_6S_8$, $FeS_2$, $TiS_2$, and $MoS_2$ and combinations thereof.

7. The energy-storage apparatus of claim 1, wherein at least one of said cathode and said anode comprises a carbonaceous material.

8. The energy-storage apparatus of claim 1, wherein said energy-storage apparatus is a secondary battery.

9. An energy-storage apparatus, comprising:

an anode configured to accept Mg ions from an electrolyte and to release Mg-ions to said electrolyte, said anode having at least one anode electrical connection on an external surface of said energy-storage apparatus, and having at least one anode surface within said energy-storage apparatus;

a cathode comprising a layered crystalline compound comprising a deliberately added specie or species so that a layer spacing of said layered crystalline compound is modified to allow for magnesium ion diffusion sufficient to support at least a C/5 discharge rate of said energy storage apparatus, said layered crystalline compound having at least one cathode electrical connection on an external surface of said energy-storage apparatus and having at least one cathode surface within said energy-storage apparatus; and said electrolyte comprising a magnesium-bearing electrolyte in contact with said at least one anode surface within said energy-storage apparatus, and in contact with said at least one cathode surface within said energy-storage apparatus.

10. The energy-storage apparatus of claim 9, wherein a layer spacing of said layered crystalline compound is modified to allow for magnesium ion diffusion sufficient to support at least a C/15 discharge rate of said energy storage apparatus.

11. The energy-storage apparatus of claim 9, wherein said energy-storage apparatus is a secondary battery.

12. The energy-storage apparatus of claim 9, wherein a shortest metal-metal inter-layer distance in said layered crystalline compound is larger than 4.8 Angstrom.

13. The energy-storage apparatus of claim 9, wherein a shortest metal-metal inter-layer distance in said layered crystalline compound is smaller than 8 Angstrom.

14. The energy-storage apparatus of claim 9, wherein a shortest metal-metal inter-layer distance in said layered crystalline compound is smaller than 12 Angstrom.

15. The energy-storage apparatus of claim 9, wherein said cathode comprising a layered crystalline compound comprises a compound having the chemical formula $Mg_aM_bX_y$, wherein M is a metal cation, or mixture of metal cations and X is an anion or mixture of anions, and a is in the range of 0 to about 2, b is in the range of about 1 to about 2, and $y \leq 9$.

16. The energy-storage apparatus of claim 9, wherein at least one of said anode and said cathode further comprises an electronically conductive additive.

17. The energy-storage apparatus of claim 9, wherein at least one of said anode and said cathode further comprises a polymer binder.

18. The energy-storage apparatus of claim 9, wherein said anode configured to accept and release Mg-ions comprises a material selected from the group consisting of Mg, Mg alloys AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, and Mg alloys containing at least one of the elements Al, Ca, Bi, Sb, Sn, Ag, Cu, and Si.

19. The energy-storage apparatus of claim 9, wherein said anode configured to accept and release Mg-ions comprises insertion materials selected from the group of insertion materials consisting of Anatase $TiO_2$, rutile $TiO_2$, $Mo_6S_8$, $FeS_2$, $TiS_2$, and $MoS_2$ and combinations thereof.

20. The energy-storage apparatus of claim 9, wherein at least one of said cathode and said anode comprises a carbonaceous material.

\* \* \* \* \*